United States Patent
Li

(10) Patent No.: US 11,030,937 B2
(45) Date of Patent: Jun. 8, 2021

(54) SUB-PIXEL RENDERING METHOD AND DEVICE

(71) Applicant: Shanghai Zhaoxin Semiconductor Co., Ltd., Shanghai (CN)

(72) Inventor: Xiang Li, Shanghai (CN)

(73) Assignee: GlenFly Technology Co., Ltd., Shanghai (CN)

( * ) Notice: Subject to any disclaimer, the term of this patent is extended or adjusted under 35 U.S.C. 154(b) by 77 days.

(21) Appl. No.: 16/592,061

(22) Filed: Oct. 3, 2019

(65) Prior Publication Data

US 2020/0342804 A1 Oct. 29, 2020

(30) Foreign Application Priority Data

Apr. 24, 2019 (CN) .......................... 201910332550.6
Apr. 24, 2019 (CN) .......................... 201910332736.1

(51) Int. Cl.
*G09G 3/20* (2006.01)
*G06T 7/49* (2017.01)

(52) U.S. Cl.
CPC .............. *G09G 3/2074* (2013.01); *G06T 7/49* (2017.01); *G09G 2340/0457* (2013.01)

(58) Field of Classification Search
CPC . G09G 3/2074; G09G 2340/0457; G06T 7/49
See application file for complete search history.

(56) References Cited

U.S. PATENT DOCUMENTS

| | | | | |
|---|---|---|---|---|
| 6,927,780 B2* | 8/2005 | Guleryuz | ........... | H04N 1/40068 345/581 |
| 2003/0132943 A1* | 7/2003 | Guleryuz | ................ | G06T 5/002 345/581 |
| 2004/0189642 A1* | 9/2004 | Frisken | ................ | G06T 11/203 345/443 |
| 2004/0189643 A1* | 9/2004 | Frisken | ................ | G06T 11/203 345/467 |
| 2004/0189653 A1* | 9/2004 | Perry | .................... | G06T 11/203 345/557 |
| 2004/0189655 A1* | 9/2004 | Perry | ....................... | G09G 5/28 345/582 |
| 2004/0189663 A1* | 9/2004 | Perry | ....................... | G06T 17/00 345/611 |
| 2004/0189664 A1* | 9/2004 | Frisken | ................ | G06T 15/503 345/611 |
| 2004/0189665 A1* | 9/2004 | Perry | .................... | G06T 15/503 345/611 |
| 2004/0189666 A1* | 9/2004 | Frisken | ................ | G06T 11/001 345/611 |

(Continued)

*Primary Examiner* — Michael Pervan
(74) *Attorney, Agent, or Firm* — McClure, Qualey & Rodack, LLP

(57) ABSTRACT

A sub-pixel rendering method for generating a target image according to a source image is provided. The method includes: obtaining the source image; determining a target pixel to be rendered in the target image; calculating an edge code of the source pixel corresponding to a sub-pixel of the target pixel to be rendered in the source image; determining texture information around the sub-pixel of the target pixel to be rendered according to the edge code; and calculating a pixel value for the sub-pixel of the target pixel to be rendered according to the texture information and based on distance when the edge code is not a specific pattern.

20 Claims, 19 Drawing Sheets

(56) References Cited

U.S. PATENT DOCUMENTS

| | | | | |
|---|---|---|---|---|
| 2004/0196297 A1* | 10/2004 | Elliott | ................... | G06F 3/14 |
| | | | | 345/613 |
| 2007/0024638 A1* | 2/2007 | Hoppe | ................. | G06T 3/4007 |
| | | | | 345/606 |
| 2008/0049048 A1* | 2/2008 | Credelle | .............. | G09G 3/2074 |
| | | | | 345/690 |
| 2018/0136720 A1* | 5/2018 | Spitzer | ................... | G06T 1/20 |
| 2018/0137602 A1* | 5/2018 | Spitzer | ................. | G06T 3/4007 |

* cited by examiner

FIG. 5

SUB-PIXEL RENDERING METHOD AND DEVICE

CROSS REFERENCE TO RELATED APPLICATIONS

This application claims priority to Chinese Patent Application No. 201910332550.6 filed on Apr. 24, 2019 and Chinese Patent Application No. 201910332736.1 filed on Apr. 24, 2019 in the China Intellectual Property Office, the contents of which are incorporated by reference herein.

TECHNICAL FIELD

The present invention relates to a sub-pixel rendering method and device, and more particularly, it relates to a sub-pixel rendering method and device according to texture information and based on distance and/or area.

BACKGROUND

In the prior art, when a display displays an image in a conventional sub-pixel driving manner, one sub-pixel in the display corresponds to one color component of one source pixel in the source image. However, as the threshold of manufacturing technology rises, the number of sub-pixels on the display is also limited. In other words, it is difficult to continue to improve the resolution of a display. Therefore, when a high-resolution image is to be displayed on a lower-resolution display, how to retain the detail of the source image is a problem that is currently required to be solved.

SUMMARY

The following summary is illustrative only and is not intended to be limiting in any way. That is, the following summary is provided to introduce concepts, highlights, benefits and advantages of the novel and non-obvious techniques described herein. Selected, not all, implementations are described further in the detailed description below. Thus, the following summary is not intended to identify essential features of the claimed subject matter, nor is it intended for use in determining the scope of the claimed subject matter.

In an embodiment, a sub-pixel rendering method for generating a target image according to a source image, comprising: obtaining the source image; determining a target pixel to be rendered in the target image; calculating an edge code of the source pixel corresponding to a sub-pixel of the target pixel to be rendered in the source image; determining texture information around the sub-pixel of the target pixel to be rendered according to the edge code; and calculating a pixel value for the sub-pixel of the target pixel to be rendered according to the texture information and based on distance when the edge code is not a specific pattern.

In an embodiment, a sub-pixel rendering device, comprising: a storage device, storing a source image and a target image; a processor, generating the target image according to the source image; wherein the processor obtains the source image from the storage device, determines a target pixel to be rendered in the target image, and calculates an edge code of the source pixel corresponding to a sub-pixel of the target pixel to be rendered in the source image, determines texture information around the sub-pixel of the target pixel to be rendered according to the edge code, and calculates a pixel value for the sub-pixel of the target pixel to be rendered according to the texture information and based on distance when the edge code is not a specific pattern.

In an embodiment, a sub-pixel rendering method for generating a target image according to a source image, comprising: obtaining the source image; determining a target pixel to be rendered in the target image; calculating an edge code of the source pixel corresponding to a sub-pixel of the target pixel to be rendered in the source image; determining texture information around the sub-pixel of the target pixel to be rendered according to the edge code; and calculating a pixel value for the sub-pixel of the target pixel to be rendered according to the texture information and based on area when the edge code is not a specific pattern.

In an embodiment, a sub-pixel rendering device, comprising: a storage device, storing a source image and a target image; a processor, generating the target image according to the source image; wherein the processor obtains the source image from the storage device, determines a target pixel to be rendered in the target image, and calculates an edge code of the source pixel corresponding to a sub-pixel of the target pixel to be rendered in the source image, determines texture information around the sub-pixel of the target pixel to be rendered according to the edge code, and calculates a pixel value for the sub-pixel of the target pixel to be rendered according to the texture information and based on area when the edge code is not a specific pattern.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

Figure 5:
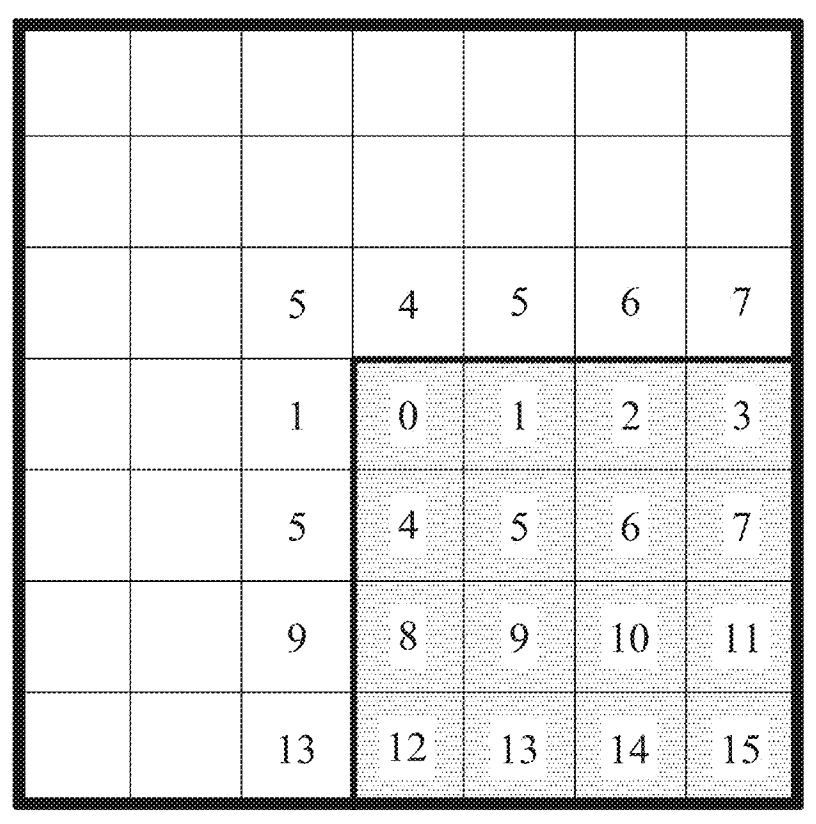

FIG. 5 is a schematic diagram illustrating how to perform a mirroring processing on the edge pixels according to an embodiment of the invention.

DETAILED DESCRIPTION

The following description is the contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
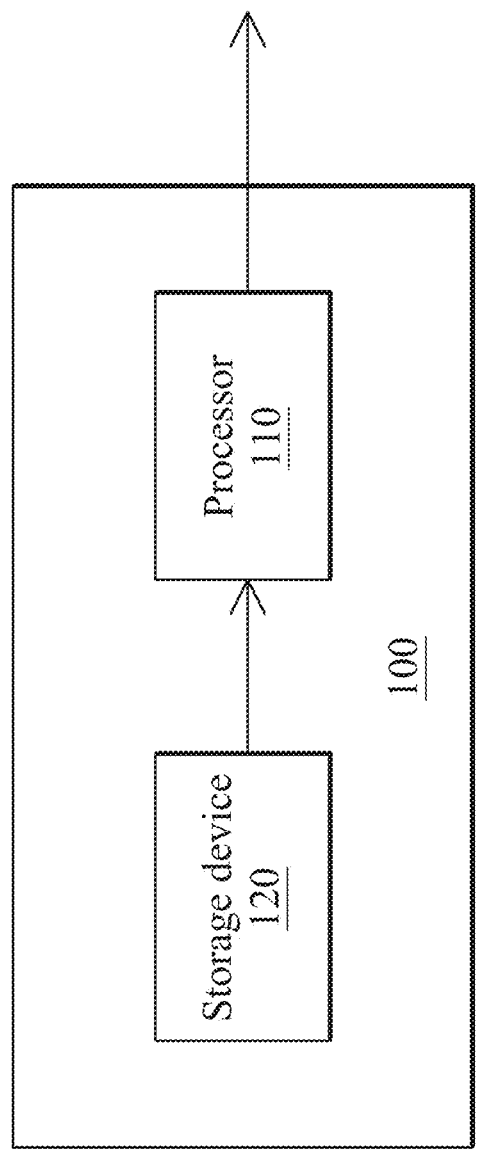
FIG. 1 shows a block diagram of an electronic device performing a sub-pixel rendering method according to one embodiment of the invention.

FIG. 1 shows a block diagram of an electronic device performing a sub-pixel rendering method according to one embodiment of the invention. The electronic device 100 comprises at least one processor 110 and one storage device 120. The processor 110 can be implemented in numerous ways, such as with dedicated hardware, or with general-purpose hardware (e.g., a single processor, multiple processors or graphics processing units capable of parallel computations, or others) to convert a source image into a target image suitable for a display having a specific sub-pixel arrangement. In the embodiment of the present invention, the height of the sub-pixel of the display (not shown in FIG. 1) is ⅔ of the height of the source pixel in the source image, and the width of the sub-pixel of the display is ¾ of the width of the source pixel in the source image. The number of rows of the source pixel in the source image is the same as the number of rows of the target pixel in the target image, and every three adjacent source pixels of the source image in each row are rendered as two target pixels of the target image by the processor 110. Each target pixel in the target image comprises three sub-pixels respectively corresponding to the R, G and B channels, and each source pixel in the source image also comprises three pixel values respectively corresponding to the R, G and B channels. The pixel values of the sub-pixels of each channel of the target pixel are calculated based on the pixel values of the corresponding channels of the source pixel, respectively. The storage device 120 can be a non-volatile memory (such as a read-only memory (ROM), a flash memory, etc.) for storing at least one source image and information needed for converting a source image into a target image suitable for a display having a specific sub-pixel arrangement. For example, the information needed for converting a source image into a target image suitable for a display having a particular sub-pixel arrangement comprises algorithms for converting source pixels to sub-pixels, and related parameters of sub-pixel rendering methods based on distance and area, etc.

In an embodiment, the electronic device 100 is a display panel controller coupled between a graphics processing unit (GPU) (not shown in FIG. 1) and a display (not shown in FIG. 1). The electronic device 100 receives a source image from the GPU, converts the received source image into a target image and transmits the target image to the display for displaying.

The processor 110 may use a sub-pixel rendering method based on distance (described in more detail below) and/or a sub-pixel rendering method based on area (described in more detail below) to convert a source image into a target image suitable for a display having a specific sub-pixel arrangement. The sub-pixel rendering method based on distance is described below.

Figure 2:
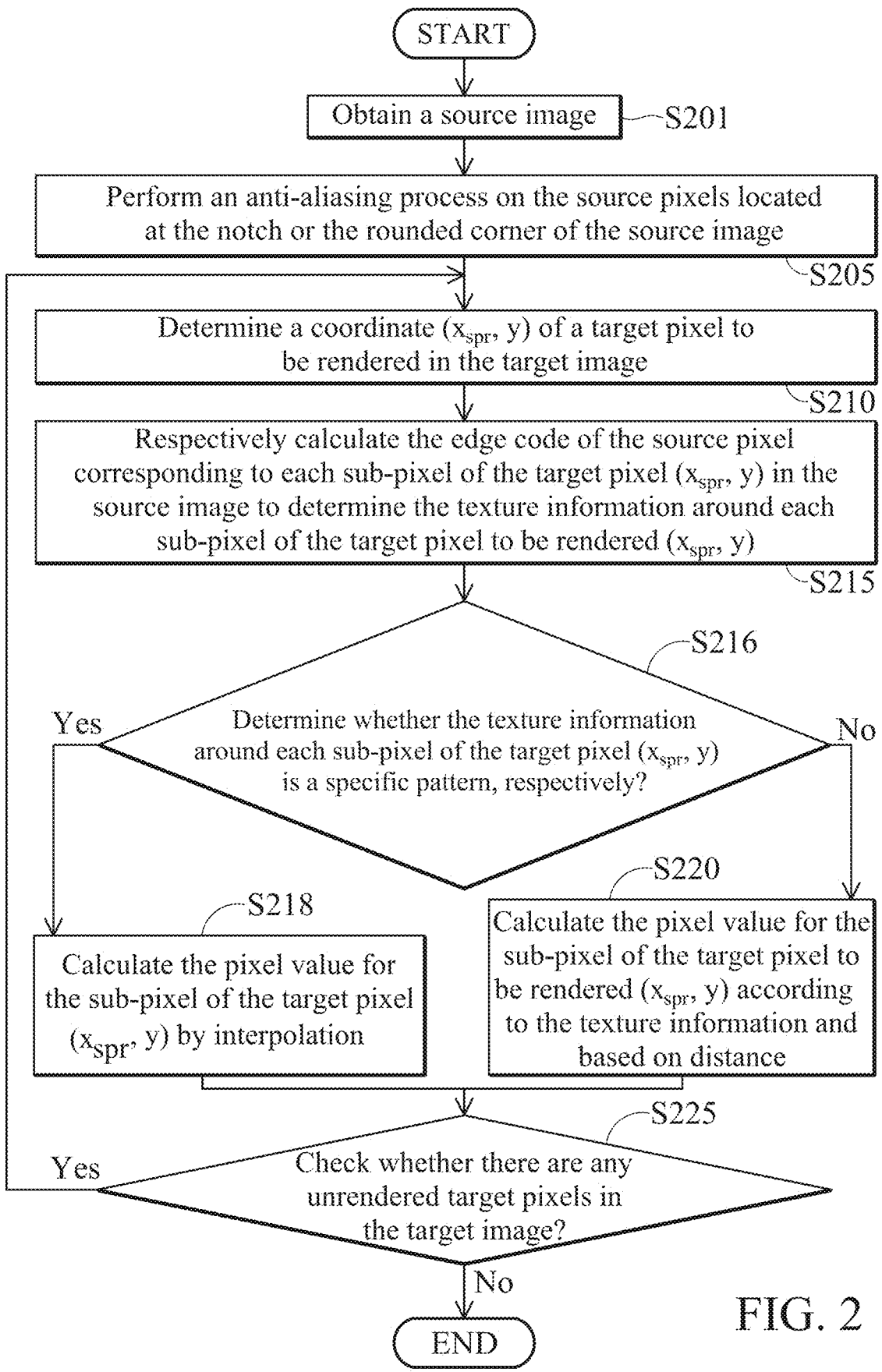
FIG. 2 is a flowchart illustrating a sub-pixel rendering method based on distance according to an embodiment of the present invention.

FIG. 2 is a flowchart illustrating a sub-pixel rendering method based on distance according to an embodiment of the present invention. The sub-pixel rendering method based on distance shown in FIG. 2 will be described in detail below with reference to FIGS. 3-12.

Firstly, in step S201, the processor 110 obtains a source image from the storage device 120. In an embodiment, the processor 110 receives the source image from a GPU and stores the received source image in the storage device 120 before performing step S201. The processor 110 then performs step S205.

Figure 3:
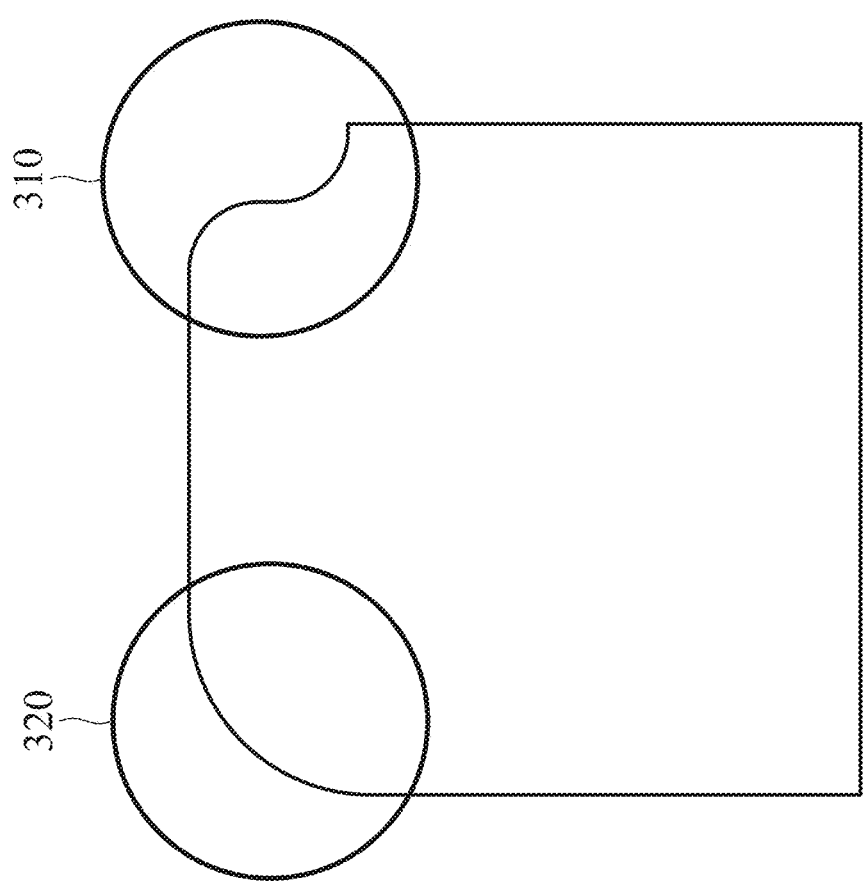
FIG. 3 is a schematic diagram illustrating a notch or a rounded corner according to an embodiment of the present invention.

In step S205, when the display used to display the target image has a notch and/or a rounded corner, the processor 110 performs an anti-aliasing process on the source pixels located at the notch or the rounded corner of the source image. Specifically, the processor 110 firstly determines whether the display has a notch or a rounded corner. As shown in FIG. 3, 310 is a notch at the edge of the display, and 320 is a rounded corner at the edge of the display. In one embodiment, when the display has a notch and/or a rounded corner, all the coordinate information of the source pixels in the source image corresponding to the notch and/or rounded corner is stored in the storage device 120. When the processor 110 can obtain the coordinate information of the source pixels in the source image corresponding to the notch and/or the rounded corner from the storage device 120, it indicates that the display has a notch and/or a rounded corner. When the display has a notch and/or a rounded corner, the processor 110 multiplies the pixel values of the source pixels located at the notch and/or the rounded corner in the source image by an attenuation coefficient to perform the anti-aliasing process. In one embodiment, the processor 110 multiplies the pixel values of the source pixels located at the edge of the notch and/or the rounded corner in the source image by the attenuation coefficient to soften the sawtooth of the notch and/or the rounded corner caused by the edge pixels. The pixel value of each sub-pixel of the target pixel in the target image is calculated in the subsequent step according to the pixel values of the source pixels of the softened source image, wherein the attenuation coefficient is related to an area of the source pixel cut by an arch of the notch and/or the rounded corner, and can be obtained using the following formula:

$$Area_{arch}=(2*offset-1)/(2*step)$$

wherein $Area_{ara}$ is the attenuation coefficient, offset is a position index of the source pixel in a sawtooth, and step is the width of the sawtooth.

Figure 4:
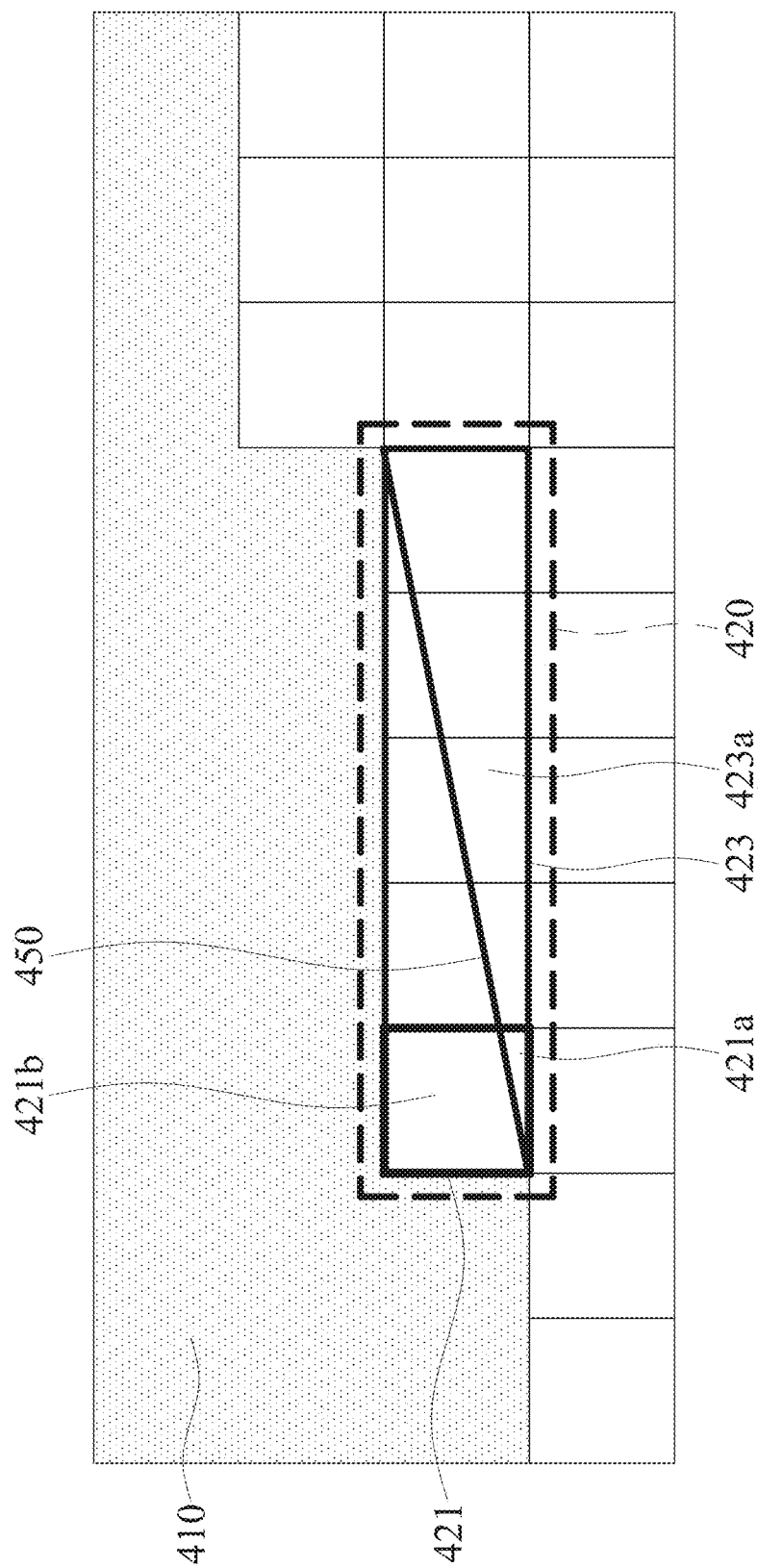
FIG. 4 is a schematic diagram illustrating a drawing process of a plurality of blocks of a source image according to an embodiment of the invention.

For example, as shown in FIG. 4, the region 410 is the region without the emitter, the region 420 (depicted by the dashed line) is one of the sawtooths in the rounded corner or the notch, and the solid line 450 is an arch close to the ideal arch in the region 420. For the source pixel 421, the region 421a is a region located within the arch, and the region 421b is a region outside the arch. According to FIG. 4, the width of the area 420 is 5 source pixels, and the source pixel 421 is the first source pixel in the area 420 (i.e., offset=1). Therefore, the attenuation coefficient corresponding to the source pixel 421 can be calculated according to the formula above, and the attenuation coefficient is $Area_{arch}=((2*1-1))/((2*5))=1/10$. In other words, the area corresponding to the area 421a is 1/10 of the entire area of the source pixel 421, and the pixel value of the softened pixel 421 is 1/10 of the original one. In another case, the attenuation coefficient of the source pixel 423 is equal to $Area_{arch}=((2*3-1))/((2*5))=5/10$. That is, the pixel value of the softened source pixel 423 is 5/10 of the original one. In other words, the area corresponding to the area 423a is 5/10 of the entire area of the source pixel 423, the pixel value of the softened source pixel 423 is 5/10 of the original one, and the rest may be deduced in the same way.

In an embodiment, the processor 110 sets the pixel value of the source pixel, which does not have a corresponding sub-pixel in the target image, in the source image to 0. It means that, in the source image, the pixel value of the source pixel corresponding to the area in the display without the emitter (the area 410 in FIG. 4) is set to 0.

In addition, in an embodiment of the present invention, when the storage device 120 stores the related information of the source pixels corresponding to the region of the sawtooth, the storage device 120 may only store a coordinate of the starting point of the region of the sawtooth, an offset direction corresponding to the x direction or y direction, and offsets of the source pixels. For example, as shown in the region 420 of FIG. 4, the storage device 120 may only store the coordinate corresponding to the source pixel 421, the offset direction corresponding to the x direction, and 5 offsets of the source pixels when the storage device 120 stores the sawtooth corresponding to the region 420.

After the processor 110 performs the anti-aliasing process on the source pixels located at the notch and/or the rounded corner, the process proceeds to step S210. In step S210, the processor 110 determines a coordinate ($x_{spr}$, y) of a target pixel to be rendered in the target image, and the process proceeds to step S215.

In step S215, the processor 110 respectively calculates the edge code of the source pixel corresponding to each sub-pixel of the target pixel ($x_{spr}$, y) in the source image to determine the texture information around each sub-pixel of the target pixel to be rendered ($x_{spr}$, y). Specifically, in order to correctly render each sub-pixel of the target pixel ($x_{spr}$, y), the processor 110 performs an edge detection on a window centered on the source pixel corresponding to each sub-pixel of the target pixel to be rendered ($x_{spr}$, y) of the target image in the source image to obtain an edge code of the source pixel corresponding to each sub-pixel of the target pixel to be rendered ($x_{spr}$, y), determines the texture information of each sub-pixel of the target pixel ($x_{spr}$, y) according to the obtained edge code, and respectively renders each sub-pixel of the target pixel ($x_{spr}$, y) having different textures using different rendering methods to obtain the pixel value of each sub-pixel of the target pixel ($x_{spr}$, y). The calculation methods of calculating the x coordinate of the source pixel corresponding to each sub-pixel of the target pixel ($x_{spr}$, y) in the source image are different depending on the target pixel to be rendered ($x_{spr}$, y) is located in the odd rows or in the even rows of the target image.

In order to better describe the calculation process of the pixel value of each sub-pixel of the target pixel ($x_{spr}$, y), the definitions of the even columns, the odd columns, the even rows, and the odd rows are explained here. Taking the target pixel ($x_{spr}$, y) as an example, $x_{spr}$ %2=0 indicates that the target pixel ($x_{spr}$, y) is located in an even column of the target image, and $x_{spr}$ %2=1 indicates that the target pixel ($x_{spr}$, y) is located in an odd column of the target image, wherein %2 represents calculating a remainder of 2; y %2=0 indicates that the target pixel ($x_{spr}$, y) is located in the even row of the target image, and y %2=1 indicates that the target pixel ($x_{spr}$, y) is located in the odd row of the target image, wherein %2 represents calculating a remainder of 2, and the rest may be deduced in the same way. The method used to determine the even/odd row and the even/odd column is also applicable to the source pixel in the source image, so the details will be omitted.

When the target pixel to be rendered ($x_{spr}$, y) is located in the even rows of the target image, the x coordinate of the source pixel in the corresponding source image is obtained using the following formula (the source pixels corresponding to the sub-pixels of the R and G channels of the target pixel are different from the sub-pixel of the B channel of the target pixel):

$$R(G): x = \text{floor}\left(\frac{3}{2}x_{spr}\right)$$

$$B: x = \text{floor}\left(\frac{3}{2}x_{spr}\right)+1$$

When the target pixel to be rendered ($x_{spr}$, y) is located in the odd rows of the target image, the x coordinate of the source pixel corresponding to the target pixel to be rendered ($x_{spr}$, y) is obtained using the following formula (the source pixel corresponding to the sub-pixels of the R and G channels of the target pixel are different from the source pixel corresponding to the sub-pixel of the B channel):

$$R(G): x = \text{floor}\left(\frac{3}{2}x_{spr}\right)+1$$

$$B: x = \text{floor}\left(\frac{3}{2}x_{spr}\right)$$

wherein floor( ) represents an operation for rounding down to an integer. The source pixel corresponding to each sub-pixel of the target pixel ($x_{spr}$, y) in the source image is (x, y). Taking the source pixel (x, y) as the center pixel, the coordinates of all the source pixels in the window can be calculated according to the coordinate of the source pixel (x, y). Taking a 3×3 window as an example, the coordinate of the source pixel above the source pixel (x, y) is (x, y−1), and the coordinate of the source pixel left to the source pixel (x, y) is (x−1, y), and so on, so that the coordinates of all 8 source pixels around the source pixel (x, y) can be obtained. The pixel value of the corresponding source pixel can be obtained from the source image according to the coordinate of the source pixel. When the processor 110 calculates the pixel value for the sub-pixel located at the edge, the processor 110 may firstly perform a mirroring processing on the source pixels located at the edge to obtain the pixel values of the virtual source pixels located outside the edge. For example, as shown in FIG. 5, the source pixels 0~15 of the shaded area in the lower right corner are source pixels located in the source image. Since the virtual source pixels located outside the source image are used when the processor 110 calculates the target pixel located at the edge, (that is, when the processor 110 calculates the pixel value for the sub-pixel corresponding to the source pixel 4 of the source image, the pixel value of the virtual source pixel located on the left side of the source pixel 4 is used), the processor 110 sets the pixel value of the source pixel 5 located on the right side of the source pixel 4 to the pixel value of the virtual source pixel located on the left side of the source pixel 4, and so on, so that the processor 110 can perform related operations according to the pixel value of the virtual source pixel when calculating the pixel value of the corresponding sub-pixel at the edge.

After obtaining the window corresponding to a certain sub-pixel of the target pixel ($x_{spr}$, y) from the source image, the processor 110 starts the calculation of the edge code. The processor 110 obtains a plurality of first difference values by respectively subtracting the pixel values of a plurality of adjacent source pixels adjacent to the source pixel in one of the directions of the window from the pixel value of the source pixel corresponding to the sub-pixel of the target pixel to be rendered ($x_{spr}$, y), obtain a plurality of second difference values by respectively subtracting the pixel value of the source pixel from the pixel values of the plurality of adjacent source pixels, obtains a first code according to results obtained by comparing the first difference values and a first threshold value, obtains a second code according to results obtained by comparing the second difference values and the second threshold, combines the first code and the second code to obtain a code of one of the directions, and finally combines the codes of the plurality of directions to obtain the edge code.

Figure 6:
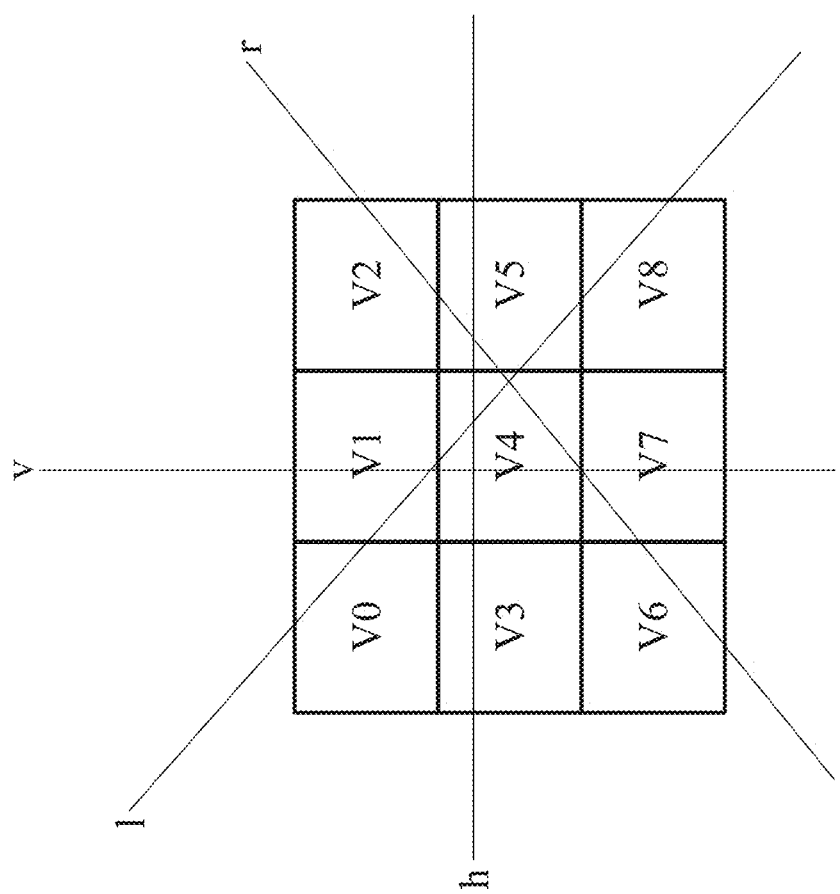
FIG. 6 is a schematic diagram illustrating the four directions (the horizontal direction (h), the upper-left-lower-right direction (l), the vertical direction (v) and the upper-right-lower-left direction (r)) of the window according to an embodiment of the invention.
Figure 7:
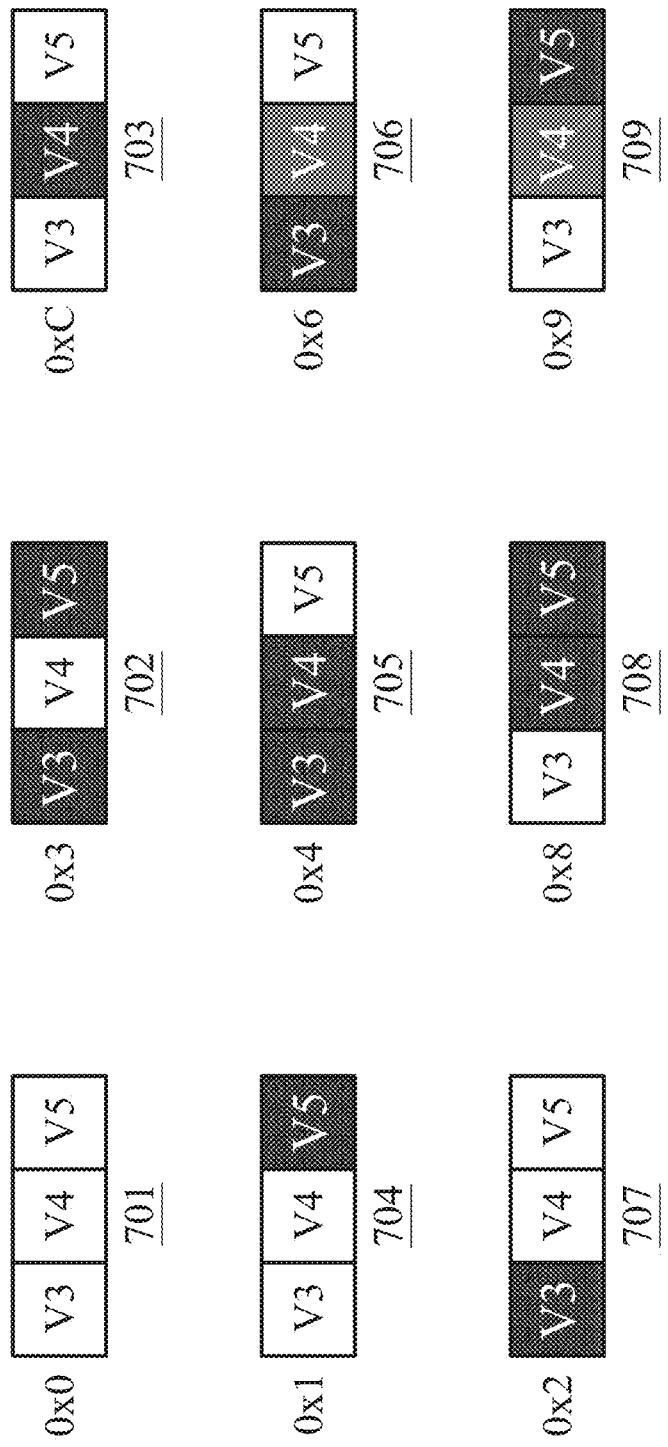
FIG. 7 is a schematic diagram illustrating nine scenarios of codes corresponding to the horizontal direction (h) according to one embodiment of the present invention.

A 3×3 window corresponding to a sub-pixel which corresponds to the R channel of the target pixel ($x_{spr}$, y) will be specifically described as an example. The edge code can be composed of four hexadecimal digits, and each digit of the edge code from left to right respectively corresponds to the horizontal direction (h), the upper-left-lower-right direction (l), the vertical direction (v), and the upper-right-lower-left direction (r) of the 3×3 window, wherein each digit represents the texture information in one direction. It should be noted that although the number of digits used in this example is four, it should not be limited in the present invention, and the number of digits is determined by the number of directions that the edge code needs to represent. For example, as shown in FIG. 6, the code in the horizontal direction (h) is calculated according to the third, fourth, and fifth source pixels in the window (i.e., V3-V5 shown in the FIG. 6), the code in the upper-left-lower-right direction (l) is calculated according to the 0th, fourth and eighth source pixels in the window (i.e., V0, V4, V8 shown in the FIG. 6), the code in the vertical direction (v) is calculated according to the first, fourth and seventh source pixels in the window (i.e., V1, V4, V7 shown in the FIG. 6), and the code in the upper-right-lower-left direction (r) is calculated according to the second, fourth, and sixth source pixels in the window (i.e., V2, V4, V6 shown in the FIG. 6), wherein the first two bits in the code of each direction are generated by subtracting the pixel value of the center pixel from the pixel values of the pixels around the center pixel, and the last two bits in the code of each direction are generated by subtracting the pixel values of the pixels around the center pixel from the pixel value of the center pixel. For example, taking the horizontal direction (h) as an example, the code in the horizontal direction (h) is H($f$(V3−V4), $f$(V5−V4), $f$(V4−V3), $f$(V4−V5)), wherein $f$( ) represents a function that outputs 1 when the value in parentheses is greater than a predetermined threshold, and outputs 0 when the value in parentheses is less than or equal to a predetermined threshold; H( ) represents a function that converts a number of four binary digits in parentheses into a number of a hexadecimal digit. For example, it is assumed that the threshold is 10, V3 is 151, V4 is 148 and V5 is 150. V3−V4 is equal to 3. Since V3−V4 is less than 10, $f$(V3−V4) outputs 0. V5−V4 is equal to 2. Since V5−V4 is less than 10, $f$(V5−V4) outputs 0. V4−V3 is equal to −3. Since V4−V3 is less than 10, $f$(V4−V3) outputs 0. V4−V5 is equal to −2. Since V4−V5 is less than 10, $f$(V4−V5) outputs 0. Therefore, the code in the h direction is 0x0 (i.e., a binary 0000). Refer to FIG. 7, FIG. 7 is a schematic diagram illustrating nine scenarios of codes corresponding to the horizontal direction (h) according to one embodiment of the present invention. As shown in 701 in FIG. 7, 0x0 indicates that the luminance values of V3, V4 and V5 are not much different; V3, V4 and V5 are all filled with white. V3, V4 and V5 may also all be filled with black (not shown in FIG. 7). Filling blocks V3, V4 and V5 with the same color means that the luminance values of V3, V4 and V5 are not much different. It is assumed that V3 is 151, V4 is 120 and V5 is 150. V3-V4 is equal to 31. Since V3−V4 is greater than 10, $f$(V3−V4) outputs 1. V5-V4 is equal to 30. Since V5-V4 is greater than 10, $f$(V5-V4) outputs 1. V4-V3 is equal to −31. Since V4-V3 is less than 10, $f$(V4−V3) outputs 0. V4−V5 is equal to −30. Since V4-V5 is less than 10, $f$(V4−V5) outputs 0. Therefore, the code in h direction is 0xC (i.e., a binary 1100). As shown in 703 in FIG. 7, the code 0xC indicates that the luminance values of V3 and V5 are both greater than the luminance value of V4. Similarly, as shown in 702 in FIG. 7, the code 0x3 indicates that the luminance values of V3 and V5 are both less than the luminance value of V4; as shown in 704, the code 0x1 indicates that the luminance values of V3 and V4 are both greater than the luminance value of V5; as shown in 705, the code 0x4 indicates that the luminance values of V3 and V4 are both less than the luminance value of V5; as shown in 706, the code 0x6 indicates that the luminance value of V3 is less than the luminance value of V4, and the luminance value of V4 is less than the luminance value of V5; as shown in 707, the code 0x2 indicates that the luminance values of V4 and V5 are both greater than the luminance value of V3; as shown in 708, the code 0x8 indicates that the luminance values of V4 and V5 are both less than the luminance value of V3; as shown in 709, the code 0x9 indicates that the luminance value of V3 is greater than the luminance value of V4, and the luminance value of V4 is greater than the luminance value of V5.

Figure 8B:
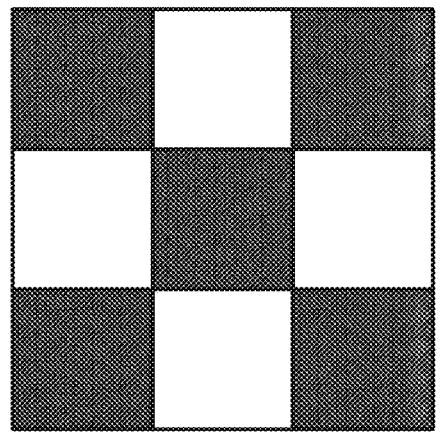
FIG. 8B is a schematic diagram illustrating the texture information corresponding to the edge code which is 0xC0C0 according to an embodiment of the present invention.
Figure 8A:
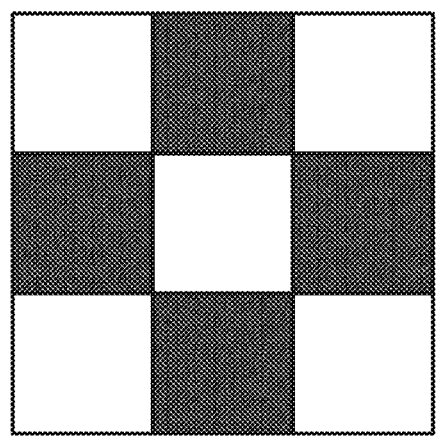
FIG. 8A is a schematic diagram illustrating the texture information corresponding to the edge code which is 0x3030 according to an embodiment of the present invention.
Figure 9:
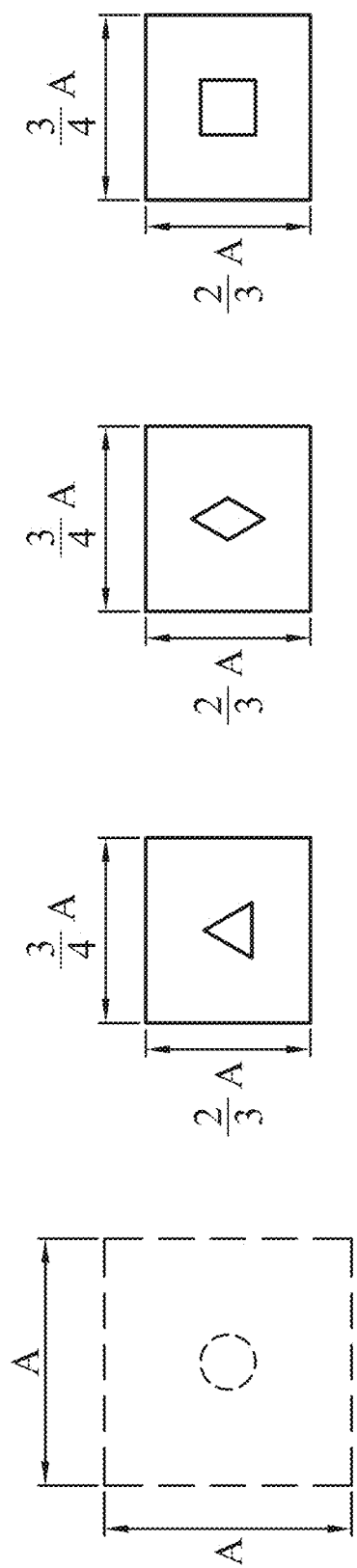
FIG. 9 is a schematic diagram illustrating the size of a source pixel and the size of a sub-pixel according to an embodiment of the present invention.
Figure 16:
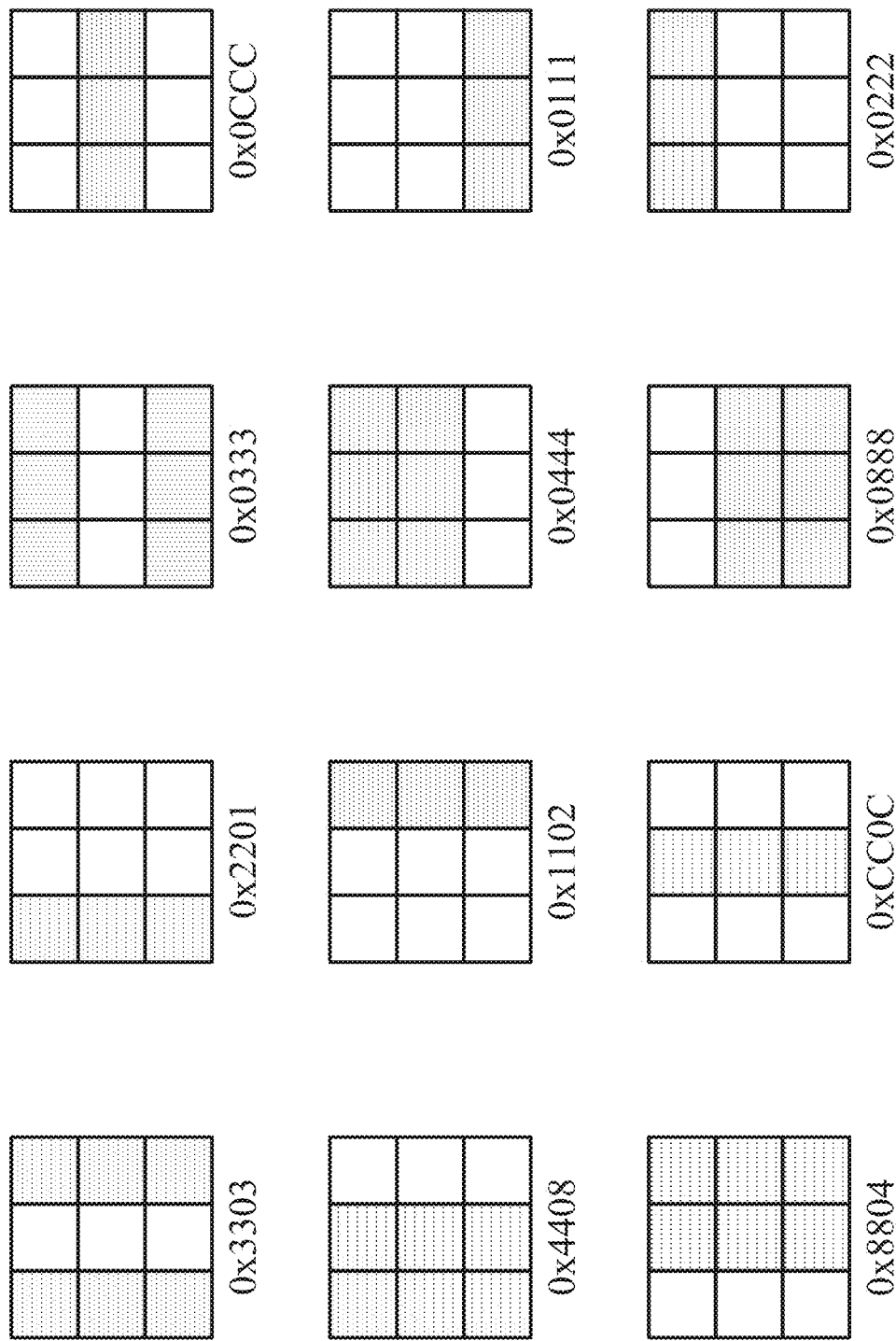
FIG. 16 is a schematic diagram illustrating the texture information corresponding to 12 edge codes that need to be sharpened according to an embodiment of the present invention.

Similarly, the codes of the upper-left-lower-right direction (l), the vertical direction (v) and the upper-right-lower-left direction (r) can be obtained. The codes of the horizontal direction (h), the upper-left-lower-right direction (l), the vertical direction (v) and the upper-right-lower-left direction (r) are arranged in order from left to right to obtain an edge code contains four hexadecimal digits. Through the last output edge code, the texture information around the sub-pixel of the R channel of the target pixel ($x_{spr}$, y) can be obtained. In an embodiment, when the edge code in the horizontal direction (h) is 0x4 or 0x8, it indicates that the texture information around the sub-pixel of the target pixel ($x_{spr}$, y) is weak. When the edge code is 0x0111, 0x0222, 0x0333, 0x0444, 0x0CCC, 0xCC0C, 0x1102, 0x2201, 0x3303, 0x4408, or 0x8804 (as shown in FIG. 16), it indicates that the texture information around the sub-pixel of the target pixel ($x_{spr}$, y) is relatively strong. When the edge code is 0x3030 (as shown in FIG. 8A) or 0xC0C0 (as shown in FIG. 8B), it indicates that the texture information around the sub-pixels of the target pixel ($x_{spr}$, y) is a specific pattern.

After the processor 110 calculates the edge code of each sub-pixel of the target pixel ($x_{spr}$, y) and determines the texture information around each sub-pixel of the target pixel ($x_{spr}$, y), the process proceeds to step S216. In step S216, the processor 110 determines whether the texture information around each sub-pixel of the target pixel ($x_{spr}$, y) is a specific pattern, respectively. In an embodiment, the processor 110 determines whether the edge code of the sub-pixel of the target pixel ($x_{spr}$, y) is 0x3030 or 0xC0C0. If "No", the process proceeds to step S220 (described in more detail below), and if "Yes", the process proceeds to step S218.

Figure 10:
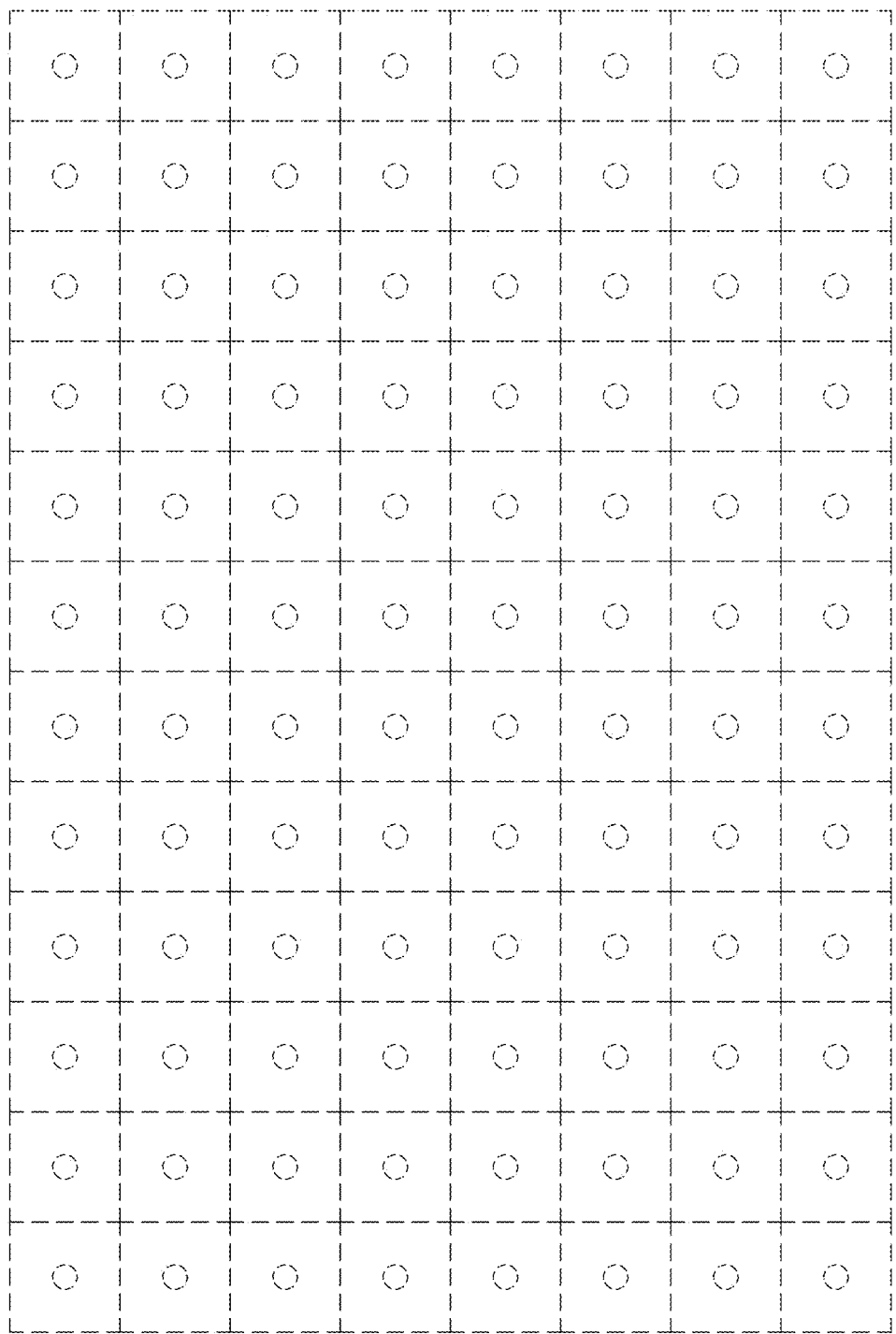
FIG. 10 is a schematic diagram illustrating the arrangement of source pixels in a source image according to an embodiment of the present invention.
Figure 11:
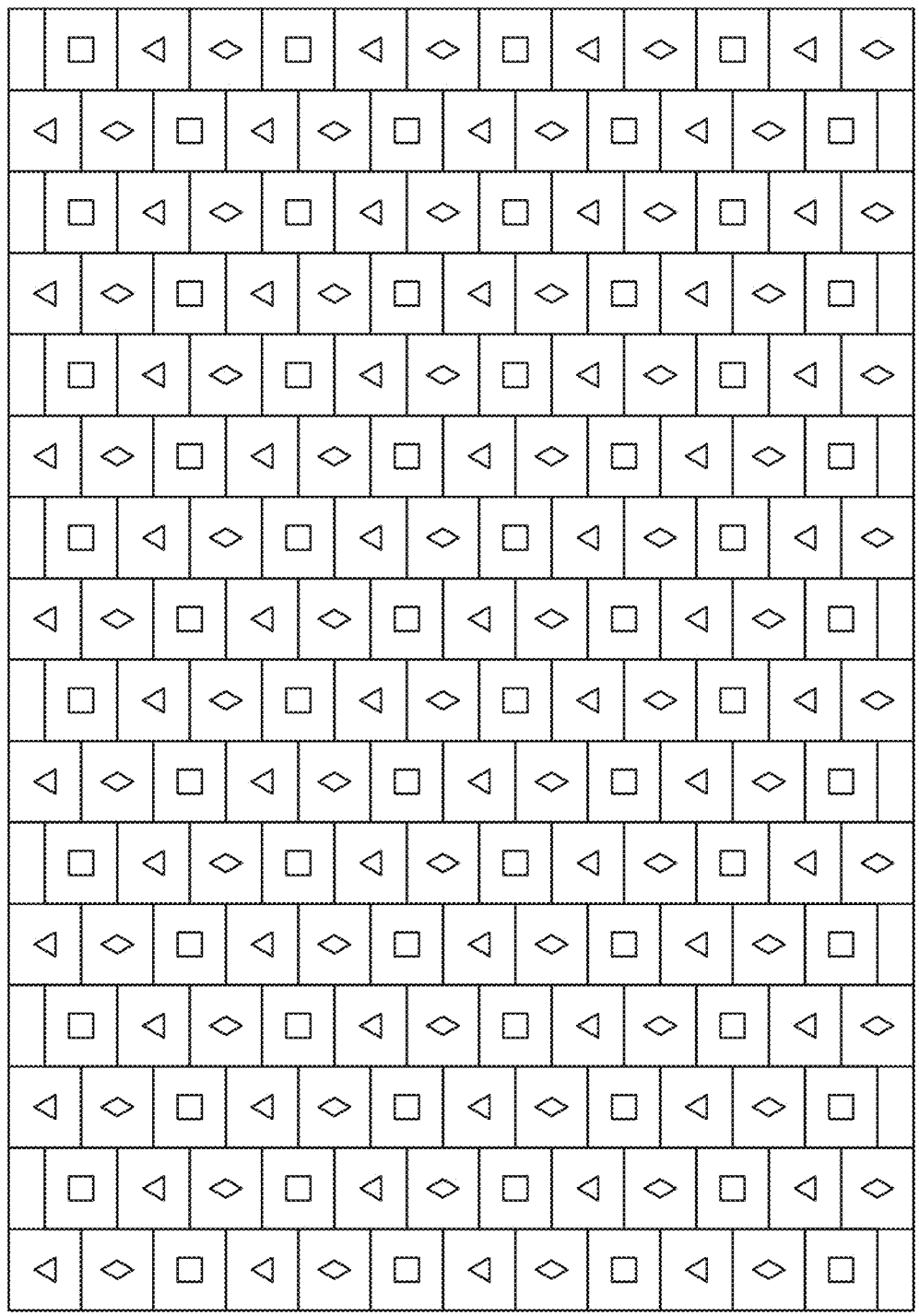
FIG. 11 is a schematic diagram illustrating the arrangement of sub-pixels according to an embodiment of the present invention.
Figure 12:
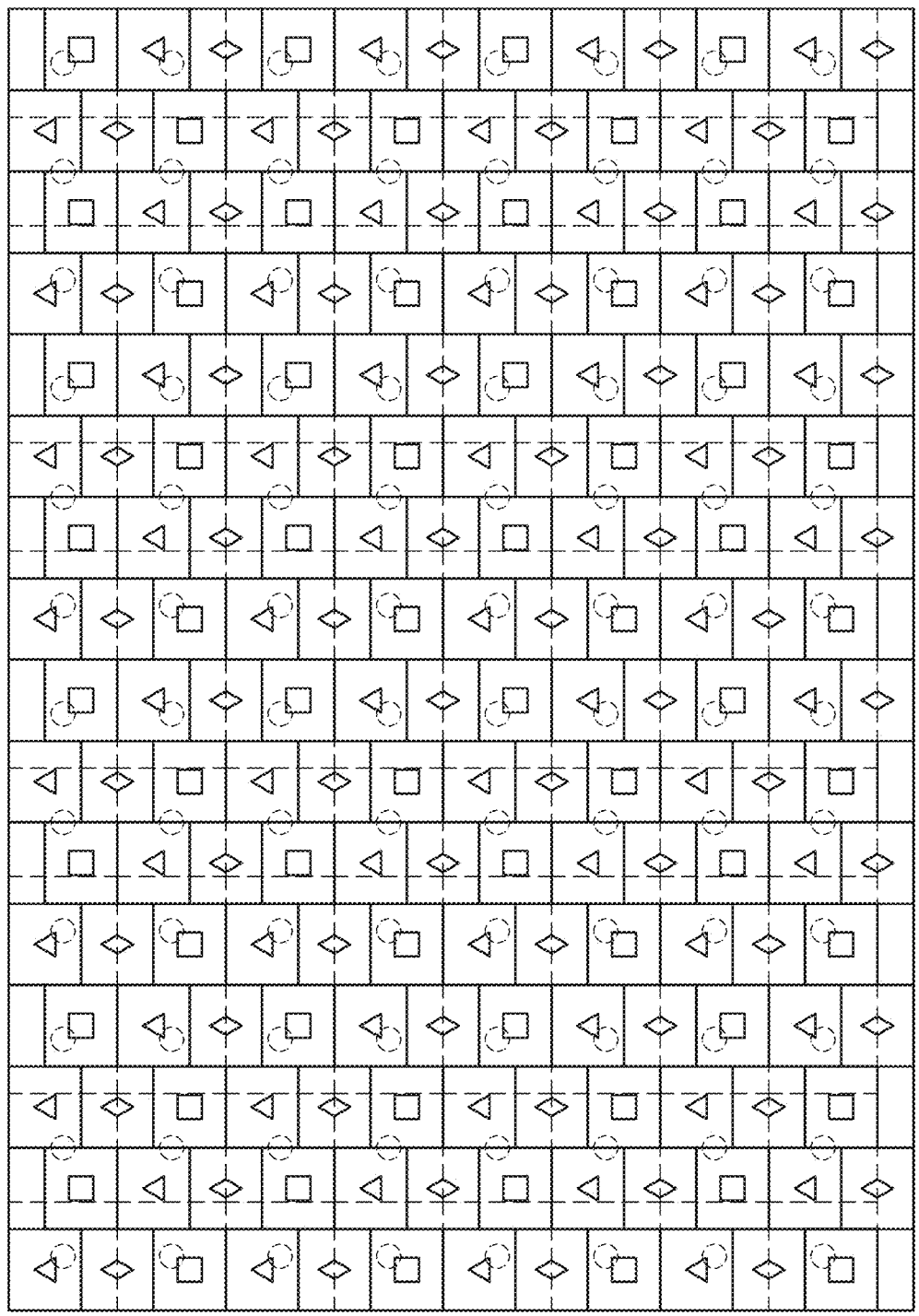
FIG. 12 is a schematic diagram illustrating that the arrangement of the source pixels in the source image is overlapped to the arrangement of the corresponding sub-pixels in the target image according to an embodiment of the present invention.

In order to better describe the calculation process of the pixel value of each sub-pixel of the target pixel ($x_{spr}$, y), the position relationship between the source pixel in the source image and each sub-pixel of the target pixel in the target image is explained firstly. As shown in FIG. 10, "○" represents a source pixel in the source image. As shown in FIG. 11, "Δ" represents a sub-pixel of the R channel of the target pixel in the target image, "◇" represents a sub-pixel of the G channel of the target pixel in the target image, and "□" represents a sub-pixel of the B channel of the target pixel in the target image. According to FIG. 9, in the embodiment of the present invention, the height of the sub-pixel of the target pixel in the target image is ⅔ of the height of the source pixel in the source image (the number of rows of the target pixel is the same as the number of rows of the source pixel), and the width of each channel of the sub-pixel of the target pixel in the target image is ¾ of the width of the channel of the source pixel in the source image (the number of target pixels in each row is ⅔ of the number of the source pixels). In other words, as shown in FIG. 12, when the source image is converted to the target image, the positions of the source pixels in the source image do not overlap with the positions of the sub-pixels of the target pixels in the target image. Therefore, in the calculation of pixel values of sub-pixels of the R channel, G channel and B channel of the target pixel in the target image, the processor 110 performs an interpolation calculation on two pixel values of the two source pixels adjacent to the sub-pixel on both left and right to obtain the pixel value for the sub-pixel of the target pixel. Step S218 is described below.

In step S218, the processor 110 directly calculates the pixel value for the sub-pixel of the target pixel ($x_{spr}$, y) by interpolation. Specifically, the processor 110 calculates the pixel value for the sub-pixel of the target pixel ($x_{spr}$, y) using the formulas below. When the target pixel ($x_{spr}$, y) in the target image is located in the even rows of the target image, the pixel values of the sub-pixels of the R, G and B channels of the target pixel ($x_{spr}$, y) in the target image are calculated using the following formulas:

$$R(G)_{x_{spr},y} = R'(G')_{\frac{3}{2}x_{spr},y} * factor_{kep},$$

$$\text{when} \begin{cases} edgecode = 0 \times 3030 \text{ and } (y/2)\%2 = x_{spr}\%2 \\ \text{or} \\ edgecode = 0 \times C0C0 \text{ and } (y/2)\%2 != x_{spr}\%2 \end{cases}$$

$$R(G)_{x_{spr},y} = \left(R'(G')_{\frac{3}{2}x_{spr}-1,y} + R'(G')_{\frac{3}{2}x_{spr}+1,y}\right) * factor_{ave},$$

$$\text{when} \begin{cases} edgecode = 0 \times 3030 \text{ and } (y/2)\%2 != x_{spr}\%2 \\ \text{or} \\ edgecode = 0 \times C0C0 \text{ and } (y/2)\%2 = x_{spr}\%2 \end{cases}$$

$$B_{x_{spr},y} = B'_{\frac{3}{2}x_{spr}+1,y} * factor_{kep},$$

$$\text{when} \begin{cases} edgecode = 0 \times 3030 \text{ and } (y/2)\%2 = x_{spr}\%2 \\ \text{or} \\ edgecode = 0 \times C0C0 \text{ and } (y/2)\%2 != x_{spr}\%2 \end{cases}$$

$$B_{x_{spr},y} = \left(B'_{\frac{3}{2}x_{spr},y} + B'_{\frac{3}{2}x_{spr}+2,y}\right) * factor_{ave},$$

$$\text{when} \begin{cases} edgecode = 0 \times 3030 \text{ and } (y/2)\%2 != x_{spr}\%2 \\ \text{or} \\ edgecode = 0 \times C0C0 \text{ and } (y/2)\%2 = x_{spr}\%2 \end{cases}$$

When the target pixel ($x_{spr}$, y) in the target image is located in the odd rows of the target image, the pixel values of sub-pixels of the R, G and B channels of the target pixel ($x_{spr}$, y) in the target image are calculated using the following formulas:

$$R(G)_{x_{spr},y} = R'(G')_{\frac{3}{2}x_{spr},y} * factor_{kep}, \text{ when } edgecode = 0 \times 3030$$

$$B_{x_{spr},y} = B'_{\frac{3}{2}x_{spr}+1,y} * factor_{kep}, \text{ when } edgecode = 0 \times C0C0$$

wherein $R(G)_{x_{spr},y}$ represents the pixel value for the sub-pixel of the R channel or the G channel of the target pixel located at the coordinate ($x_{spr}$, y) in the target image, $B_{x_{spr},y}$ represents the pixel value for the sub-pixel of the B channel of the target pixel located at the coordinate ($x_{spr}$, y) in the target image, $R'(G')_{(x,y)}$ represents the pixel value of the R channel or the G channel of the source pixel located at the coordinate (x, y) in the source image, and $B'_{(x,y)}$ represents the pixel value of the B channel of the source pixel located at the coordinate (x, y) in the source image. Each $3/2x_{spr}$ in the formulas comprises an operation for rounding down to an integer, $factor_{kep}$ is a preset value, $factor_{ave}$ is a preset value, and edgecode represents an edge code. Also, in the embodiment of the present invention, the value of $factor_{kep}$ is 1.0, and the value of $factor_{ave}$ is 0.5. However, it should be noted that the values of $factor_{kep}$ and $factor_{ave}$ can be adjusted according to the needs of the user, and are not limited to the present invention. In an example, when the $x_{spr}$ coordinate of the sub-pixel of the R channel of the target pixel is 5, the processor 110 multiplies the value of the $factor_{kep}$ by the pixel value of the source pixel whose the x coordinate is 7 to obtain the pixel value corresponding to the sub-pixel of the target pixel.

In step S220, the processor 110 calculates the pixel value for the sub-pixel of the target pixel to be rendered ($x_{spr}$, y) according to the texture information and based on distance. Specifically, the pixel values of the sub-pixels of the R, G and B channels corresponding to the even rows of the target pixel to be rendered ($x_{spr}$, y) can be obtained using the following formulas:

$$R(G)_{x_{spr},y} = \begin{cases} factor_{rg00} * R'(G')_{(\frac{3}{2}x_{spr}-1,y)} + (1 - factor_{rg00}) * R'(G')_{(\frac{3}{2}x_{spr},y)}, & x_{spr} \%2 = 0 \\ factor_{rg01} * R'(G')_{(\frac{3}{2}x_{spr},y)} + (1 - factor_{rg01}) * R'(G')_{(\frac{3}{2}x_{spr}+1,y)}, & x_{spr} \%2 = 1 \end{cases}$$

$$B_{x_{spr},y} = \begin{cases} factor_{b00} * B'_{(\frac{3}{2}x_{spr},y)} + (1 - factor_{b00}) * B'_{(\frac{3}{2}x_{spr}+1,y)}, & x_{spr} \%2 = 0 \\ factor_{b01} * B'_{(\frac{3}{2}x_{spr}+1,y)} + (1 - factor_{b01}) * B'_{(\frac{3}{2}x_{spr}+2,y)}, & x_{spr} \%2 = 1 \end{cases}$$

And the pixel values of the sub-pixels of the R, G and B channels corresponding to the odd rows of the target pixel to be rendered ($x_{spr}$, y) can be obtained using the following formulas:

$$R(G)_{x_{spr},y} = \begin{cases} factor_{rg10} * R'(G')_{(\frac{3}{2}x_{spr},y)} + (1 - factor_{rg10}) * R'(G')_{(\frac{3}{2}x_{spr}+1,y)}, & x_{spr} \%2 = 0 \\ factor_{rg11} * R'(G')_{(\frac{3}{2}x_{spr}+1,y)} + (1 - factor_{rg11}) * R'(G')_{(\frac{3}{2}x_{spr}+2,y)}, & x_{spr} \%2 = 1 \end{cases}$$

$$B_{x_{spr},y} = \begin{cases} factor_{b10} * B'_{(\frac{3}{2}x_{spr}-1,y)} + (1 - factor_{b10}) * B'_{(\frac{3}{2}x_{spr},y)}, & x_{spr} \%2 = 0 \\ factor_{b11} * B'_{(\frac{3}{2}x_{spr},y)} + (1 - factor_{b11}) * B'_{(\frac{3}{2}x_{spr}+1,y)}, & x_{spr} \%2 = 1 \end{cases}$$

wherein $R(G)_{x_{spr},y}$ represents the pixel value for the sub-pixel of the R channel or the G channel of the target pixel ($x_{spr}$, y), $B_{x_{spr},y}$ represents the pixel value of sub-pixel of the B channel of the target pixel ($x_{spr}$, y), $R'(G')_{(x,y)}$ represents the pixel value of the R channel or the G channel of the source pixel located at the coordinate (x, y), $B'_{(x,y)}$ represents the pixel value of the B channel of the source pixel located at the coordinate (x, y), Each 3/2 $x_{spr}$ in the formulas comprises an operation for rounding down to an integer (for example, 3 x3/2=4), wherein %2 represents calculating a remainder of 2, and thus $x_{spr}$ %2=0 represents an even column, and $x_{spr}$ %2=1 represents an odd column. In an embodiment, when the texture information corresponding to the sub-pixel of the target pixel ($x_{spr}$, y) is weak (that is, when the code of the horizontal direction (h) of the edge code is 0x8 or 0x4), a smoothing process is performed by the processor 110 during calculation of the pixel value for the sub-pixel of the target pixel ($x_{spr}$, y). Specifically, when the code in the horizontal direction (h) is 0x8 and $x_{spr}$ %2=0 or when the code in the horizontal direction (h) is 0x4 and $x_{spr}$ %2=1, $factor_{smooth}$ is used to replace $factor_{rg(b)}$, wherein $factor_{smooth}$ is a preset value, $factor_{rg(b)}$ represents $factor_{rg00}$, $factor_{rg01}$, $factor_{rg10}$, $factor_{rg11}$, $factor_{b00}$, $factor_{b01}$, $factor_{b10}$, or $factor_{b11}$, and $factor_{smooth}$, $factor_{rg00}$, $factor_{rg01}$, $factor_{rg10}$, $factor_{rg11}$, $factor_{b00}$, $factor_{b01}$, $factor_{b10}$, and $factor_{b11}$ are preset values.

For example, the processor 110 may calculate the pixel value for the sub-pixel of the R channel of the target pixel located at (3, 1) in the target image according to the pixel values of the R channel of the source pixels located at (3, 1) and (4, 1) in the source image, and so on.

In an embodiment of the present invention, the values of $factor_{rg00}$, $factor_{rg01}$, $factor_{rg10}$, $factor_{rg11}$, $factor_{b00}$, $factor_{b01}$, $factor_{b10}$, and $factor_{b11}$ are all 0.7. Alternatively, according to another embodiment of the present invention, the values of $factor_{rg00}$, $factor_{rg10}$, $factor_{rg11}$, $factor_{b00}$, $factor_{b01}$ and $factor_{b10}$ are all 1.0, and the values of $factor_{rg01}$ and $factor_{b11}$ are 0.7. In other words, the values of factors of the sub-pixels of the R, G and B channels of the target pixel applied to the different rows/columns may vary depending on the user's demand for color displaying. In addition, the value of factor can be 0.5 in response to the texture around the sub-pixel of the target pixel is smoother or there is no texture around the sub-pixel of the target pixel.

After the processor 110 calculates the pixel values of all the sub-pixels of the target pixel ($x_{spr}$, y), the process proceeds to step S225. In step S225, the processor 110 checks whether there are any unrendered target pixels in the target image. If "No" (it means that the sub-pixels of all the target pixels in the target image have been rendered), the process is ended. Then, the processor 110 can transmit the rendered target image to the display for displaying. Otherwise, the process returns to step S210 and the processor 110 continues rendering the next one of the unrendered target pixel.

Figure 13:
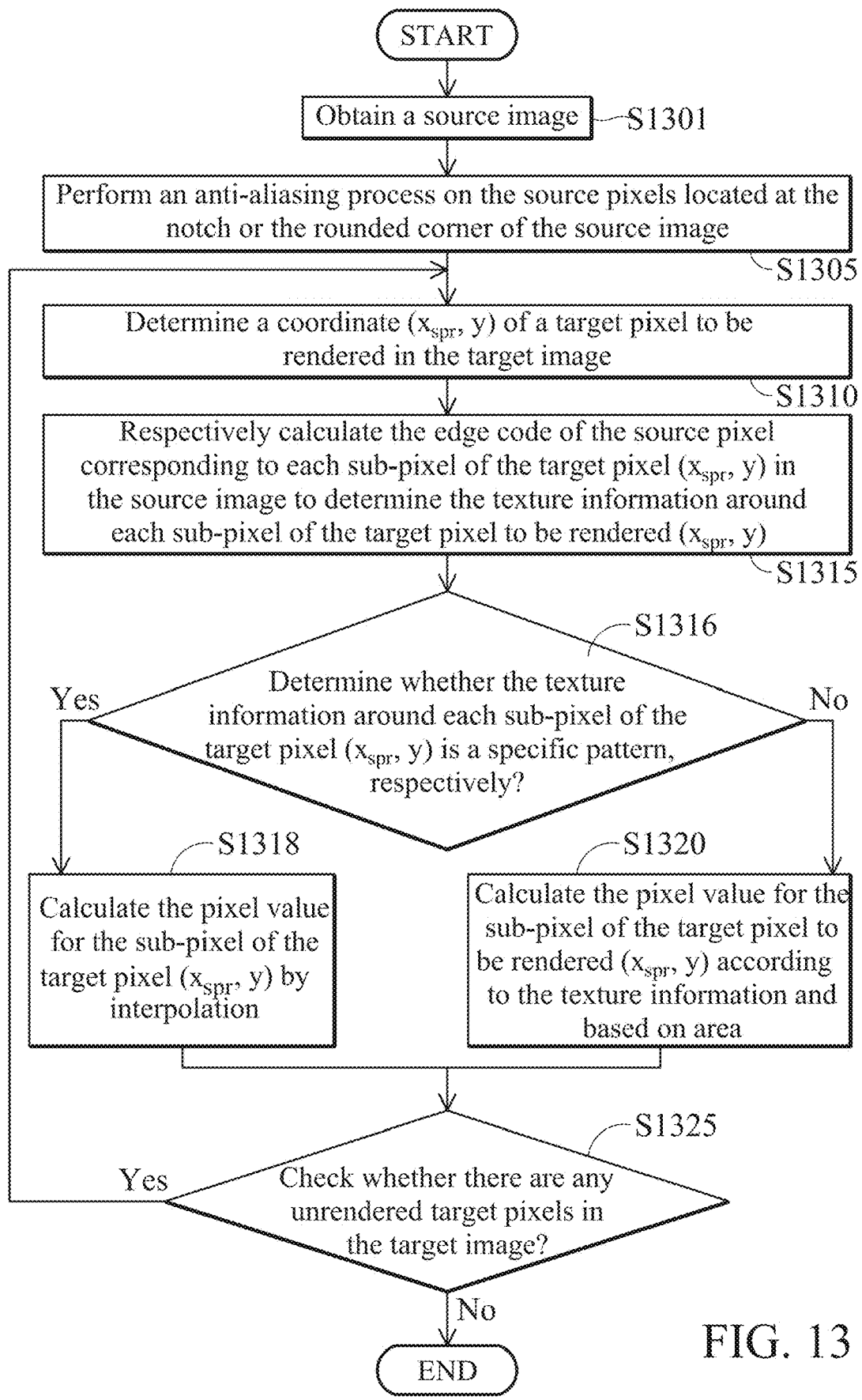
FIG. 13 is a flowchart illustrating a sub-pixel rendering method based on area according to an embodiment of the present invention.

The sub-pixel rendering method based on area is described below. FIG. 13 is a flowchart illustrating a sub-pixel rendering method according to the texture information and based on area according to an embodiment of the present invention. FIG. 13 will be described below with reference to FIGS. 14~16.

Figure 14:
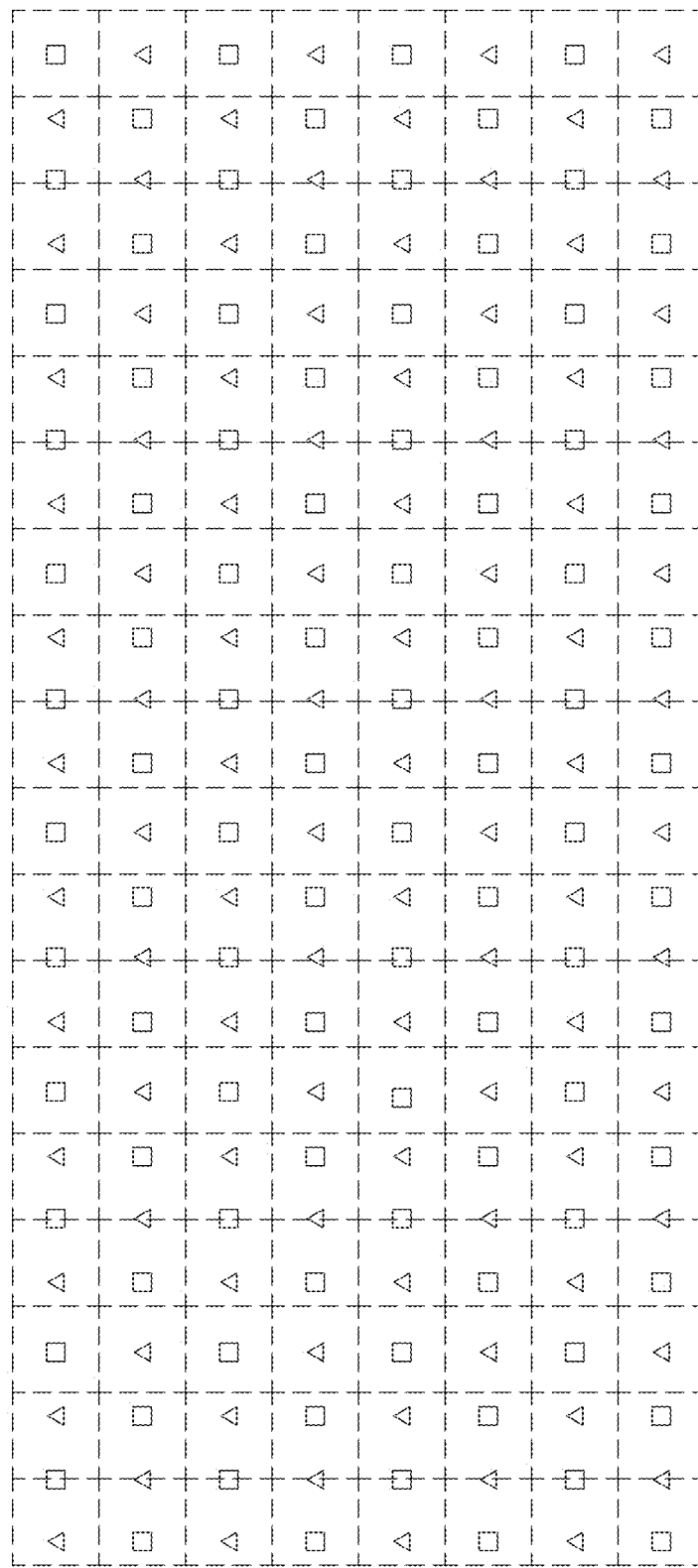
FIG. 14 is a schematic diagram illustrating that the arrangement of the source pixels in the source image is overlapped to the arrangement of the corresponding sub-pixels in the target image according to another embodiment of the present invention.

FIG. 14 is a schematic diagram illustrating that the arrangement of the source pixels in the source image is overlapped to the arrangement of the corresponding sub-pixels in the target image according to another embodiment of the present invention. FIGS. 15A~15D are schematic diagrams illustrating how to calculate the pixel values of the sub-pixels of the B channel of the target pixel according to the texture information and based on area according to an embodiment of the present invention. FIG. 16 is a schematic diagram illustrating the texture information corresponding to 12 edge codes that need to be sharpened according to an embodiment of the present invention.

As shown in FIG. 13, steps S1301, S1305, S1310, S1316, S1318, and S1325 are the same as steps S201, S205, S210, S216, S218, and S225 in FIG. 2, respectively, so details related to the steps will be omitted. Step S1315 and S1320 are described below. In FIG. 13, the processor 110 calculates the pixel value for the sub-pixel of the target pixel to be rendered ($x_{spr}$, y) based on area in step S1320, while in FIG.

2, the processor 110 calculates the pixel value for the sub-pixel of the target pixel to be rendered ($x_{spr}$, y) based on distance in step S220. Therefore, step S1315 in FIG. 13 and step S215 in FIG. 2 are different. It means that the formulas used to calculate the coordinate of the source pixel corresponding to the sub-pixel of the target pixel ($x_{spr}$, y) in the source image in the embodiments of FIG. 13 and FIG. 2 are also different. The details are as follows:

When the target pixel to be rendered ($x_{spr}$, y) is in the even rows of the target image, the x coordinate of the source pixel in the corresponding source image is obtained using the following formulas (the source pixels corresponding to the sub-pixels of the R and G channels and the B channel of the target pixel may be different):

$$R(G): x = \text{floor}\left(\frac{3}{2}x_{spr}\right)$$

$$B: x = \begin{cases} \text{floor}\left(\frac{3}{2}x_{spr}\right), & x_{spr}\%2 = 0 \\ \text{floor}\left(\frac{3}{2}x_{spr}\right) + 1, & x_{spr}\%2 = 1 \end{cases}$$

And when the target pixel to be rendered ($x_{spr}$, y) is in the odd rows of the target image, the x coordinate of the source pixel in the corresponding source image is obtained using the following formulas (the source pixels corresponding to the sub-pixels of the R and G channels and the B channel of the target pixel may be different):

$$R(G): x = \begin{cases} \text{floor}\left(\frac{3}{2}x_{spr}\right), & x_{spr}\%2 = 0 \\ \text{floor}\left(\frac{3}{2}x_{spr}\right) + 1, & x_{spr}\%2 = 1 \end{cases}$$

$$B: x = \text{floor}\left(\frac{3}{2}x_{spr}\right)$$

wherein floor( ) represents an operation for rounding down to an integer. The source pixel in the source image corresponding to the sub-pixel of the target pixel to be rendered ($x_{spr}$, y) is (x, y), wherein %2 represents calculating a remainder of 2, and thus $x_{spr}$ %2=0 represents an even column, and $x_{spr}$ %2=1 represents an odd column.

Step S1320 is described below. In step S1320, the processor 110 calculates a pixel value for the sub-pixel of the target pixel to be rendered ($x_{spr}$, y) according to the texture information and based on area. Specifically, as shown in FIG. 14, "Δ" represents the sub-pixels of the R channel or the G channel of the target pixel to be rendered, "□" represents the sub-pixel of the B channel of the target pixel to be rendered, and the center of a small dotted square is the location where a source pixel of the source image is. When the processor 110 calculates the pixel value for the sub-pixel of a target pixel to be rendered in a target image, the processor 110 firstly obtains a corresponding window in the source image centered on the sub-pixel of the target pixel to be rendered in the target image. It should be noted that the window here is different from the window obtained to calculate the edge code in the step S1315. The following takes a 3×3 window as an example, and the details are shown as follows.

When the sub-pixel of the target pixel to be rendered is the sub-pixel of the R channel or the G channel of the target pixel, the source pixels contained in the window of the source image corresponding to the sub-pixels of the target pixel to be rendered located at the even rows and even columns, even rows and odd columns, and odd rows and even columns of the target image are:

$$\text{Src\_R}(G)\_3 \times 3 = \begin{bmatrix} R'(G')_{(\frac{3}{2}x_{spr}-1,y-1)} & R'(G')_{(\frac{3}{2}x_{spr},y-1)} & R'(G')_{(\frac{3}{2}x_{spr}+1,y-1)} \\ R'(G')_{(\frac{3}{2}x_{spr}-1,y)} & R'(G')_{(\frac{3}{2}x_{spr},y)} & R'(G')_{(\frac{3}{2}x_{spr}+1,y)} \\ R'(G')_{(\frac{3}{2}x_{spr}-1,y+1)} & R'(G')_{(\frac{3}{2}x_{spr},y+1)} & R'(G')_{(\frac{3}{2}x_{spr}+1,y+1)} \end{bmatrix}$$

And the source pixels contained in the window of the source image corresponding to the sub-pixels of the target pixel to be rendered located in the odd rows and odd columns of the target image are:

$$\text{Src\_R}(G)\_3 \times 3 = \begin{bmatrix} R'(G')_{(\frac{3}{2}x_{spr},y-1)} & R'(G')_{(\frac{3}{2}x_{spr}+1,y-1)} & R'(G')_{(\frac{3}{2}x_{spr}+2,y-1)} \\ R'(G')_{(\frac{3}{2}x_{spr},y)} & R'(G')_{(\frac{3}{2}x_{spr}+1,y)} & R'(G')_{(\frac{3}{2}x_{spr}+2,y)} \\ R'(G')_{(\frac{3}{2}x_{spr},y+1)} & R'(G')_{(\frac{3}{2}x_{spr}+1,y+1)} & R'(G')_{(\frac{3}{2}x_{spr}+2,y+1)} \end{bmatrix}$$

wherein $R'(G')_{(x,y)}$ represents the pixel values of the R channel or the G channel of source pixel located at (x, y).

In addition, when the sub-pixel of the target pixel to be rendered is the sub-pixel of the B channel of the target pixel, the source pixels contained in the window of the source image corresponding to the sub-pixels of the target pixel to be rendered located at the even rows and even columns, odd rows and even columns, and odd rows and odd columns of the target image are:

$$\text{Src\_B}\_3 \times 3 = \begin{bmatrix} B'_{(\frac{3}{2}x_{spr}-1,y-1)} & B'_{(\frac{3}{2}x_{spr},y-1)} & B'_{(\frac{3}{2}x_{spr}+1,y-1)} \\ B'_{(\frac{3}{2}x_{spr}-1,y)} & B'_{(\frac{3}{2}x_{spr},y)} & B'_{(\frac{3}{2}x_{spr}+1,y)} \\ B'_{(\frac{3}{2}x_{spr}-1,y+1)} & B'_{(\frac{3}{2}x_{spr},y+1)} & B'_{(\frac{3}{2}x_{spr}+1,y+1)} \end{bmatrix}$$

And the source pixels contained in the window of the source image corresponding to the sub-pixels of the target pixel to be rendered located in the even rows and odd columns of the target image are:

$$\text{Src\_B}\_3 \times 3 = \begin{bmatrix} B'_{(\frac{3}{2}x_{spr},y-1)} & B'_{(\frac{3}{2}x_{spr}+1,y-1)} & B'_{(\frac{3}{2}x_{spr}+2,y-1)} \\ B'_{(\frac{3}{2}x_{spr},y)} & B'_{(\frac{3}{2}x_{spr}+1,y)} & B'_{(\frac{3}{2}x_{spr}+2,y)} \\ B'_{(\frac{3}{2}x_{spr},y+1)} & B'_{(\frac{3}{2}x_{spr}+1,y+1)} & B'_{(\frac{3}{2}x_{spr}+2,y+1)} \end{bmatrix}$$

wherein $B'_{(x,y)}$ represents the pixel value of the B channel of the source image located at (x, y).

Figure 15A:
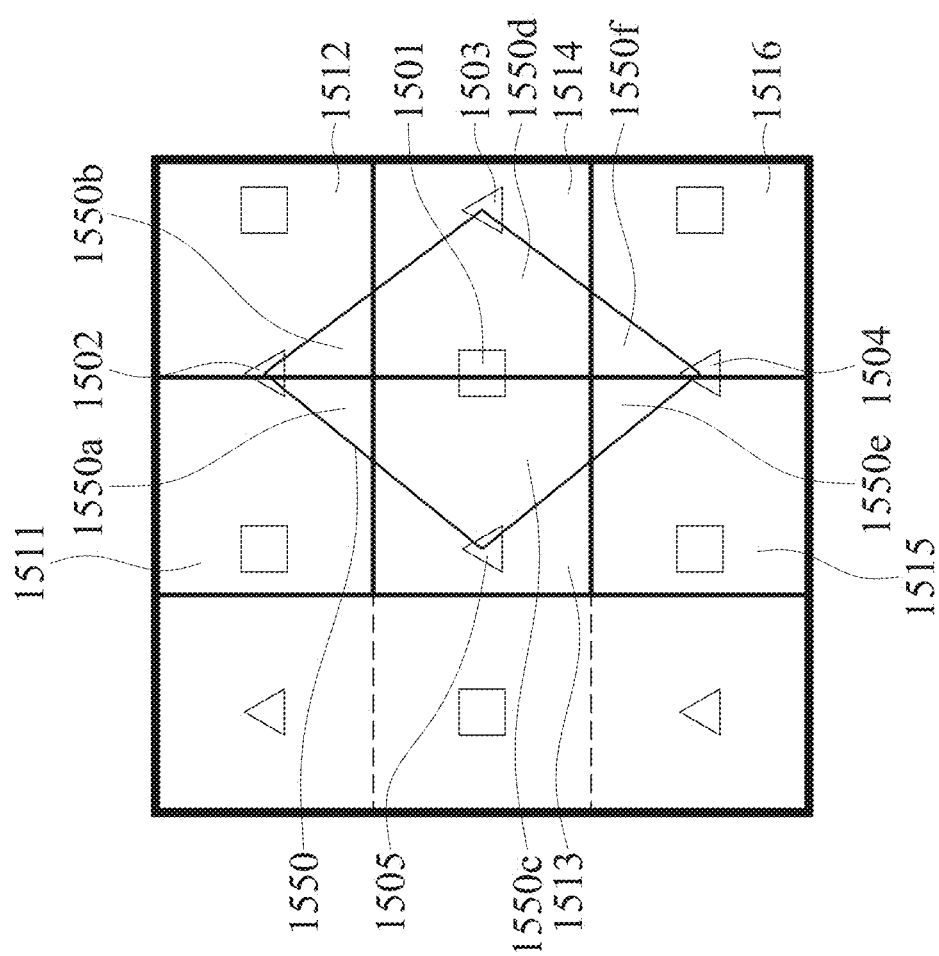
FIGS. 15A~15D are schematic diagrams illustrating how to calculate the pixel values of the sub-pixels of the B channel of the target pixel according to the texture information and based on area according to an embodiment of the present invention.
Figure 15B:
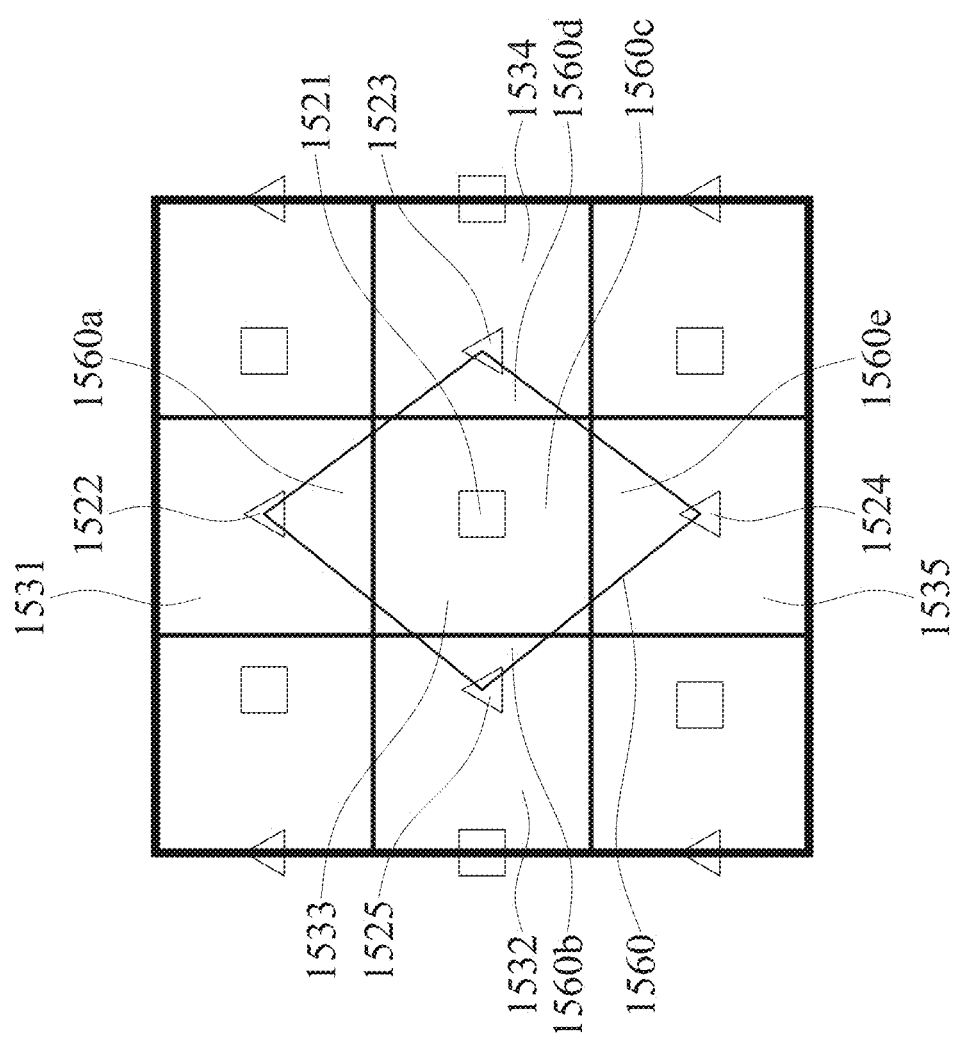
Figure 15C:
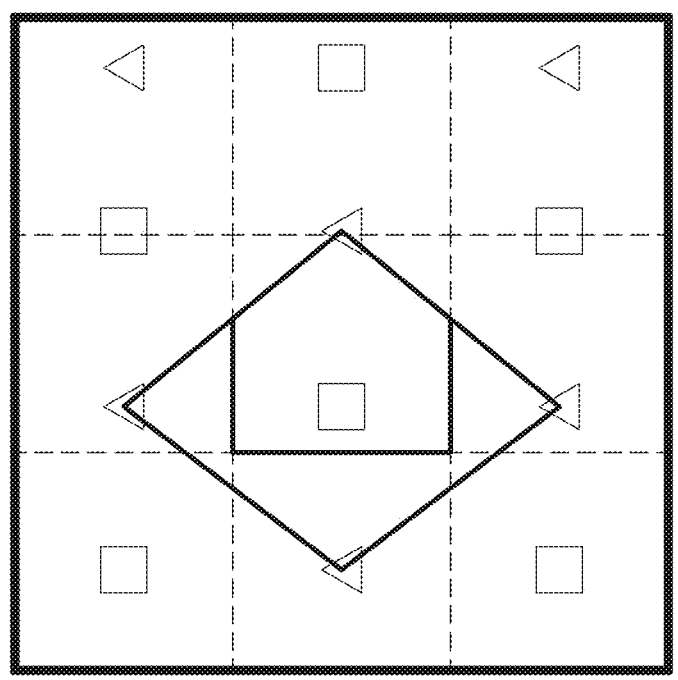
Figure 15D:
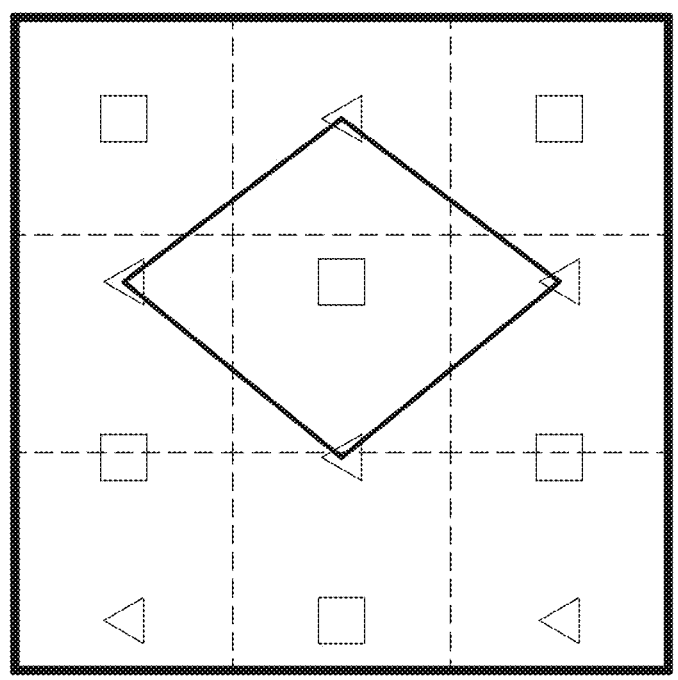

After the processor 110 obtains the source pixels contained in the window of the source image corresponding to the sub-pixels of the target pixel to be rendered (such as the 3×3 small and dashed squares shown in FIG. 14), the processor 110 obtains a diamond-shaped region based on the sub-pixels on the upper side, the lower side, the left side and the right side of the sub-pixel of the target pixel to be rendered. As shown in FIGS. 15A~15D, "Δ" represents the sub-pixel of the R/G channels of the target pixel to be rendered, "□" represents the sub-pixel of the B channel of the target pixel to be rendered, and the 9 small squares represent the source pixels contained in the window of the source image corresponding to the sub-pixels of the target pixel to be rendered. There are 4 different types of diamond-shaped regions. The diamond 1550 in FIG. 15A is a diamond-shaped region obtained when the sub-pixel of the B channel of the target pixel to be rendered is in an even row and an even column of the target image. The diamond 1560 in FIG. 15B is a diamond-shaped region obtained when the sub-pixel of the B channel of the target pixel to be rendered is in an even row and an odd column of the target image. The diamond in FIG. 15C is a diamond-shaped region obtained when the sub-pixel of the B channel of the target pixel to be rendered is in an odd row and an even column of the target image. The diamond in FIG. 15D is a diamond-shaped region obtained when the sub-pixel of the B channel of the target pixel to be rendered is in an odd row and an odd column of the target image.

Then, the processor 110 calculates the pixel value for the sub-pixel of the target pixel to be rendered in the corresponding target image according to the ratio of the area of the diamond-shaped region to the area of the surrounding source pixels. That is, the processor 110 determines the ratio of the area of the diamond-shaped region to the area of the surrounding source pixels. Finally, the processor 110 multiplies the ratio of the area of each sub-region of the diamond-shaped region to the area of the corresponding source pixel by the pixel value of the corresponding source pixel, and adds them together to obtain the pixel value for the sub-pixel of the target pixel to be rendered.

As shown in FIG. 15A, in order to obtain the pixel value for the sub-pixel 1501 of the B channel of the target pixel to be rendered, the processor 110 obtains a diamond-shaped region 1550 based on the sub-pixels 1502~1505 of the R/G channels of the target pixel on the upper side, the lower side, the left side and the right side of the sub-pixel 1501 of the B channel of the target pixel. Then, the processor 110 calculates the pixel value for the sub-pixel of the target pixel to be rendered according to the area occupied by the diamond-shaped region in a plurality of source pixels in the source image. The diamond-shaped region 1550 is composed of the sub-regions 1550*a*-1550*f*, and the sub-regions 1550*a*~1550*f* are a part of the source pixels at the right two columns (that is, the pixels 1511~1516 of the source image shown in FIG. 15A) in the source pixels contained in the 3×3 window. The processor 110 then respectively calculates the ratio of the area of the sub-region 1550*a* to the area of the pixel 1511 of the source image, the ratio of the area of the sub-region 1550*b* to the area of the pixel 1512 of the source image, the ratio of the area of the sub-region 1550*c* to the area of the pixel 1513 of the source image, the ratio of the area of the sub-region 1550*d* to the area of the pixel 1514 of the source image, the ratio of the area of the sub-region 1550*e* to the area of the pixel 1515 of the source image, and the ratio of the area of the sub-region 1550*f* to the area of the pixel 1516 of the source image. The processor 110 respectively multiplies the corresponding ratio of the area of each sub-region by the pixel value of the B channel of the corresponding source pixel in the 3×3 source pixels, and adds the values corresponding to each sub-region together to obtain the pixel value of the sub-pixel 1501 of the B channel of the target image to be rendered. For example, it is assumed that the ratio of the area of the sub-region 1550*d* to the area of the pixel 1514 of the source image is 54/144. When the pixel value of the B channel corresponding to the pixel 1514 of the source image is 144, the value corresponding to the sub-region 1550*d* is 54, and so on.

As shown in FIG. 15B, in order to obtain the pixel value for the sub-pixel 1521 of the B channel of the target pixel to be rendered, the processor 110 obtains a diamond-shaped region 1560 based on the sub-pixels 1522~1525 of the R/G channels of the target pixel on the upper side, the lower side, the left side and the right side of the sub-pixel 1521 of the B channel of the target pixel. Then, the processor 110 calculates the pixel value for the sub-pixel 1521 of the target pixel to be rendered according to the area occupied by the diamond-shaped region in a plurality of source pixels in the source image. The diamond-shaped region 1560 is composed of the sub-regions 1560*a*-1560*e*, and the sub-regions 1560*a*~1560*e* are a part of the second, fourth to sixth and eighth source pixels (that is, the pixels 1531~1535 of the source image shown in FIG. 15B) in the 3×3 source image. The processor 110 then respectively calculates the ratio of the area of the sub-region 1560*a* to the area of the pixel 1531 of the source image, the ratio of the area of the sub-region 1560*b* to the area of the pixel 1532 of the source image, the ratio of the area of the sub-region 1560*c* to the area of the pixel 1533 of the source image, the ratio of the area of the sub-region 1560*d* to the area of the pixel 1534 of the source image, and the ratio of the area of the sub-region 1560*e* to the area of the pixel 1535 of the source image. The processor 110 respectively multiplies the corresponding ratio of the area of each sub-region by the pixel value of the B channel of the corresponding source pixel in the 3×3 source pixels, and adds the values corresponding to each sub-region together to obtain the pixel value of the sub-pixel 1521 of the B channel of the target image to be rendered.

The manner of calculating the pixel value for the sub-pixel as shown in FIGS. 15C and 15D is similar to that in FIGS. 15A and 15B. The difference is that the areas occupied by the diamond-shaped region in the source pixels of the source image are different. It is not described here for simplicity. It should be noted that, as described above, the area configuration information of the sub-pixels of each channel and the source pixels of the source image has been previously stored in the storage device 120. The processor 110 may access the corresponding area configuration information stored in the storage device 120 according to the row and column corresponding to the sub-pixel of the target pixel, and uses the pixel value of the pixel of the 3×3 source image corresponding to each sub-region and the corresponding area configuration information to obtain the pixel value of the corresponding sub-pixel of the target pixel to be rendered. It should be noted that the configuration of the diamond-shaped region corresponding to the sub-pixel of the R channel or the G channel of the target pixel to be rendered in the 3×3 source pixels is reversed to the configuration of the diamond-shaped region corresponding to the sub-pixel of the B channel of the target pixel to be rendered in the 3×3 source pixels. In other words, when "Δ" is exchanged with "□" (that is, when "□" are the sub-pixels corresponding to the R channel/G channel and "Δ" are the sub-pixels corresponding to the B channel), FIG. 15A is the situation in which the sub-pixel of the R channel/G channel of the target pixel to be rendered locates in the odd row and the odd column, FIG. 15B is the situation in which the sub-pixel of the R channel/G channel of the target pixel to be rendered locates in the odd row and the even column, FIG. 15C is the situation in which the sub-pixels of the R channel/G channel of the target pixel to be rendered locates in the even row and the odd column, and FIG. 15D is the situation in which the sub-pixel of the R channel/G channel of the target pixel to be rendered locates in the even row and the even column.

For example, the pixel of the source image around the sub-pixel of the R channel of the target pixel to be rendered located at (1, 1) is:

$$\begin{bmatrix} R'_{(0,0)} & R'_{(1,0)} & R'_{(2,0)} \\ R'_{(0,1)} & R'_{(1,1)} & R'_{(2,1)} \\ R'_{(0,2)} & R'_{(1,2)} & R'_{(2,2)} \end{bmatrix}$$

According to the aforementioned content, (1, 1) corresponds to an odd row and an odd column, so the processor 110 calculates the pixel value for the sub-pixel of the R channel of the corresponding the target pixel to be rendered through multiplying the obtained pixel value of the source pixel by the corresponding ratio of the area getting from the area configuration of the diamond-shaped region in FIG. 15A.

In addition, according to the sub-pixel rendering method based on area in an embodiment of the present invention, when the texture information corresponding to the sub-pixel of the target pixel to be rendered is any one of the 12 patterns shown in FIG. 16 (wherein the block in white represents "1" and the block in black represents "0" in FIG. 16), (that is, when the texture corresponding to the sub-pixel of the target pixel to be rendered is relatively strong), the processor 110 performs a sharpening process on the sub-pixel of the target pixel to be rendered to make the target image clearer. Specifically, when the texture corresponding to the sub-pixel of the target pixel to be rendered is relatively strong, the processor 110 performs a convolution operation on the 3×3 source pixels corresponding to the sub-pixel of the target pixel to be rendered in the source image by using a diamond filter to obtain a sharpening parameter. Then, the processor 110 obtains a value by adding the sharpening parameter to the pixel value for the sub-pixel of the target pixel to be rendered which is obtained based on area, wherein the obtained value is the pixel value of the sharpened sub-pixel of the target pixel to be rendered. The following is an example of a diamond filter in an embodiment of the present invention:

$$\begin{bmatrix} 0 & -1 & 0 \\ -1 & 4 & -1 \\ 0 & -1 & 0 \end{bmatrix}$$

According to another embodiment of the present invention, after the processor 110 obtains the pixel values of sub-pixel of the R channel, G channel, and B channel of the corresponding target pixel to be rendered according to the sub-pixel rendering method based on distance and the sub-pixel rendering method based on area, respectively, the processor 110 may further combines the two calculation results according to predetermined weights to obtain a final pixel value. For example, the processor 110 can respectively give weights of 0.5 for each of the two calculation results to average the pixel values obtained by the sub-pixel rendering method based on distance and the sub-pixel rendering method based on area.

In summary, according to the sub-pixel rendering method and device in the present invention, two-thirds of the target pixels corresponding to pixels of the source image is obtained by interpolating two or more source pixels of the source image, so that one-third of the emitters can be saved without changing the quality of the image. In addition, in the process of calculating the pixel value of each sub-pixel of the target pixel to be rendered, a special processing is performed on the pixels having the special textures (for example, the edge code described above is a specific pattern) according to the texture information around the sub-pixel of the target pixel in the method of the present invention. When the pixel value for the sub-pixel of the target pixel to be rendered is calculated by using different methods (for example, based on distance and/or area), the smoothing process or the sharpening process is performed on the pixel value for the sub-pixel of the target pixel to be rendered according to the texture information (such as the situation that the texture is weak or strong described above) to obtain an optimal image conversion effect. Moreover, in response to the display having a rounded corner and/or a notch, the method of the present invention may further performs the anti-aliasing process on the source pixel corresponding to the regions of the rounded corner and/or the notch to improve the quality of the final output image.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sub-pixel rendering method for generating a target image according to a source image, comprising:
   obtaining the source image;
   determining a target pixel to be rendered in the target image;
   calculating an edge code of the source pixel corresponding to a sub-pixel of the target pixel to be rendered in the source image;
   determining texture information around the sub-pixel of the target pixel to be rendered according to the edge code; and
   calculating a pixel value for the sub-pixel of the target pixel to be rendered according to the texture information and based on distance when the edge code is not a specific pattern.

2. The sub-pixel rendering method as claimed in claim 1, wherein the step of calculating an edge code of the source pixel corresponding to a sub-pixel of the target pixel to be rendered in the source image further comprises:
   obtaining a source coordinate of the source pixel corresponding to the sub-pixel of the target pixel to be rendered;
   obtaining a plurality of pixel values of a window centered on the source coordinate in the source image; and
   calculating the edge code according to the pixel values of the window.

3. The sub-pixel rendering method as claimed in claim 2, wherein when the target pixel to be rendered is located in an even rows of the target image, the source coordinate corresponding to the sub-pixel of an R channel and/or a G channel of the target pixel to be rendered is $$\left(\text{floor}\left(\frac{3}{2}x_{spr}\right), y\right),$$

and the source coordinate corresponding to the sub-pixel of a B channel of the target pixel to be rendered is $$\left(\text{floor}\left(\frac{3}{2}x_{spr}\right)+1, y\right),$$

wherein $x_{spr}$ represents the x coordinate of the target pixel to be rendered, y represents the y coordinate of the target pixel to be rendered, and floor( ) represents an operation for rounding down to an integer.

4. The sub-pixel rendering method as claimed in claim 2, wherein when the target pixel to be rendered is located in odd rows of the target image, the source coordinate corresponding to the sub-pixel of an R channel and/or a G channel of the target pixel to be rendered is $$\left(\text{floor}\left(\frac{3}{2}x_{spr}\right)+1, y\right),$$

the source coordinate corresponding to the sub-pixel of a B channel of the target pixel to be rendered is $$\left(\text{floor}\left(\frac{3}{2}x_{spr}\right), y\right),$$

wherein $x_{spr}$ represents the x coordinate of the target pixel to be rendered, y represents the y coordinate of the target pixel to be rendered, and floor( ) represents an operation for rounding down to an integer.

5. The sub-pixel rendering method as claimed in claim 1, wherein the edge code comprises a plurality of digits, wherein each digit represents the texture information in one direction.

6. The sub-pixel rendering method as claimed in claim 1, wherein the edge code comprises four hexadecimal digits, wherein the edge code having the specific pattern is 0x3030 or 0xC0C0.

7. The sub-pixel rendering method as claimed in claim 1, wherein the step of calculating a pixel value for the sub-pixel of the target pixel to be rendered according to the texture information and based on distance further comprises:

when the texture information around the sub-pixel of the target pixel to be rendered is weak, a smoothing process is performed during calculation of the pixel value for the sub-pixel of the target pixel to be rendered.

8. The sub-pixel rendering method as claimed in claim 7, wherein when a code of the horizontal direction in the edge code is 0x8 or 0x4, determining that the texture information around the sub-pixel of the target pixel to be rendered is weak.

9. The sub-pixel rendering method as claimed in claim 7, wherein when the sub-pixel of the target pixel to be rendered is located in the even rows of the target image, the formulas used in the smoothing process during calculation of the pixel value for the sub-pixel of the target pixel to be rendered are:

$$R(G)_{x_{spr},y} = \begin{cases} factor_{rg00} * R'(G')_{(\frac{3}{2}x_{spr}-1,y)} + (1 - factor_{rg00}) * R'(G')_{(\frac{3}{2}x_{spr},y)}, & x_{spr} \%2 = 0 \\ factor_{rg01} * R'(G')_{(\frac{3}{2}x_{spr},y)} + (1 - factor_{rg01}) * R'(G')_{(\frac{3}{2}x_{spr}+1,y)}, & x_{spr} \%2 = 1 \end{cases}$$

$$B_{x_{spr},y} = \begin{cases} factor_{b00} * B'_{(\frac{3}{2}x_{spr},y)} + (1 - factor_{b00}) * B'_{(\frac{3}{2}x_{spr}+1,y)}, & x_{spr} \%2 = 0 \\ factor_{b01} * B'_{(\frac{3}{2}x_{spr}+1,y)} + (1 - factor_{b01}) * B'_{(\frac{3}{2}x_{spr}+2,y)}, & x_{spr} \%2 = 1 \end{cases}$$

wherein when the code in the horizontal direction is 0x8 and $x_{spr}$ %2=0 or when the code in the horizontal direction is 0x4 and $x_{spr}$ %2=1, $factor_{smooth}$ is used to replace $factor_{rg(b)}$, wherein $factor_{rg(b)}$ represents $factor_{rg00}$, $factor_{rg01}$, $factor_{rg10}$, $factor_{rg11}$, $factor_{b00}$, $factor_{b01}$, $factor_{b10}$, or $factor_{b11}$;

wherein $R(G)_{x_{spr},y}$ represents the pixel value for the sub-pixel of the R channel or the G channel of the target pixel to be rendered, and $B_{x_{spr},y}$ represents the pixel value for the sub-pixel of the B channel of the target pixel to be rendered, $R'(G')_{(x,y)}$ represents the pixel value of the R channel or the G channel of the source pixel located at the coordinate (x, y), $B'_{(x,y)}$ the coordinate (x, y), each $3/2x_{spr}$ in the formulas comprises an operation for rounding down to an integer, $x_{spr}$ %2=0 indicates that the target pixel to be rendered is located in the even columns of the target image, and $x_{spr}$ %2=1 indicates that the target pixel to be rendered is located in the odd columns of the target image, and $factor_{smooth}$, $factor_{rg00}$, $factor_{rg01}$, $factor_{rg10}$, $factor_{rg11}$, $factor_{b00}$, $factor_{b01}$, $factor_{b10}$, and $factor_{b11}$ are preset values.

10. The sub-pixel rendering method as claimed in claim 7, wherein when the target pixel to be rendered is located in the odd rows of the target image, the formulas used in the smoothing process during calculation of the pixel value for the sub-pixel of the target pixel to be rendered are:

$$R(G)_{x_{spr},y} = \begin{cases} factor_{rg10} * R'(G')_{(\frac{3}{2}x_{spr},y)} + (1 - factor_{rg10}) * R'(G')_{(\frac{3}{2}x_{spr}+1,y)}, & x_{spr} \%2 = 0 \\ factor_{rg11} * R'(G')_{(\frac{3}{2}x_{spr}+1,y)} + (1 - factor_{rg11}) * R'(G')_{(\frac{3}{2}x_{spr}+2,y)}, & x_{spr} \%2 = 1 \end{cases}$$

$$B_{x_{spr},y} = \begin{cases} factor_{b10} * B'_{(\frac{3}{2}x_{spr}-1,y)} + (1 - factor_{b10}) * B'_{(\frac{3}{2}x_{spr},y)}, & x_{spr} \%2 = 0 \\ factor_{b11} * B'_{(\frac{3}{2}x_{spr},y)} + (1 - factor_{b10}) * B'_{(\frac{3}{2}x_{spr}+1,y)}, & x_{spr} \%2 = 1 \end{cases}$$

wherein when the code in the horizontal direction is 0x8 and $x_{spr}$ %2=0 or when the code in the horizontal direction is 0x4 and $x_{spr}$ %2=1, $factor_{smooth}$ is used to replace $factor_{rg(b)}$, wherein $factor_{rg(b)}$ represents factor$_{rg00}$, factor$_{rg01}$, factor$_{rg10}$, factor$_{rg11}$, factor$_{b00}$, factor$_{b01}$, factor$_{b10}$, or factor$_{b11}$;
wherein R(G)$_{x_{spr},y}$ represents the pixel value for the sub-pixel of the R channel or the G channel of the target pixel to be rendered, and B$_{x_{spr},y}$ represents the pixel value for the sub-pixel of the B channel of the target pixel to be rendered, R'(G')$_{(x,y)}$ represents the pixel value of the R channel or the G channel of the source pixel located at the coordinate (x, y), B'$_{(x,y)}$ represents the pixel value of the B channel of the source pixel located at the coordinate (x, y), each 3/2x$_{spr}$ in the formulas comprises an operation for rounding down to an integer, x$_{spr}$ %2=0 indicates that the target pixel to be rendered is located in the even columns of the target image, and x$_{spr}$ %2=1 indicates that the target pixel to be rendered is located in the odd columns of the target image, and factor smooth, factor$_{rg00}$, factor$_{rg01}$, factor$_{rg10}$, factor$_{rg11}$, factor$_{b00}$, factor$_{b01}$, factor$_{b10}$, and factor$_{b11}$ are preset values.

11. The sub-pixel rendering method as claimed in claim 1, further comprising:
when the edge code is the specific pattern and the target pixel to be rendered is located in even rows of the target image, the pixel value for the sub-pixel of the target pixel to be rendered is calculated using the following formulas:

$$R(G)_{x_{spr},y} = R'(G')_{\frac{3}{2}x_{spr},y} * factor_{kep},$$

when $\begin{cases} edgecode = 0 \times 3030 \text{ and } (y/2)\%2 = x_{spr}\%2 \\ \text{or} \\ edgecode = 0 \times C0C0 \text{ and } (y/2)\%2 != x_{spr}\%2 \end{cases}$ $$R(G)_{x_{spr},y} = \left(R'(G')_{\frac{3}{2}x_{spr}-1,y} + R'(G')_{\frac{3}{2}x_{spr}+1,y}\right) * factor_{ave},$$

when $\begin{cases} edgecode = 0 \times 3030 \text{ and } (y/2)\%2 != x_{spr}\%2 \\ \text{or} \\ edgecode = 0 \times C0C0 \text{ and } (y/2)\%2 = x_{spr}\%2 \end{cases}$ $$B_{x_{spr},y} = B'_{\frac{3}{2}x_{spr}+1,y} * factor_{kep},$$

when $\begin{cases} edgecode = 0 \times 3030 \text{ and } (y/2)\%2 = x_{spr}\%2 \\ \text{or} \\ edgecode = 0 \times C0C0 \text{ and } (y/2)\%2 != x_{spr}\%2 \end{cases}$ $$B_{x_{spr},y} = \left(B'_{\frac{3}{2}x_{spr},y} + B'_{\frac{3}{2}x_{spr}+2,y}\right) * factor_{ave}$$

when $\begin{cases} edgecode = 0 \times 3030 \text{ and } (y/2)\%2 != x_{spr}\%2 \\ \text{or} \\ edgecode = 0 \times C0C0 \text{ and } (y/2)\%2 = x_{spr}\%2 \end{cases}$ wherein R(G)$_{x_{spr},y}$ represents the pixel value for the sub-pixel of the R channel or the G channel of the target pixel to be rendered which is located at the coordinate (x$_{spr}$, y), and B$_{x_{spr},y}$ represents the pixel value for the sub-pixel of the B channel of the target pixel to be rendered which is located at the coordinate (x$_{spr}$, y), R'(G')$_{x,y}$ represents the pixel value of the R channel or the G channel of the source pixel located at the coordinate (x, y), B'$_{x,y}$ represents the pixel value of the B channel of the source pixel located at the coordinate (x, y), each 3/2x$_{spr}$ in the formula comprises an operation for rounding down to an integer, factor$_{kep}$ and factor$_{ave}$ are preset values, and edgecode represents the edge code.

12. The sub-pixel rendering method as claimed in claim 1, further comprising:
when the edge code is the specific pattern and the target pixel to be rendered is located in odd rows of the target image, the pixel value for the sub-pixel of the target pixel to be rendered is calculated by the following formulas:

$$R(G)_{x_{spr},y} = R'(G')_{\frac{3}{2}x_{spr},y} * factor_{kep}, \text{ when } edgecode = 0 \times 3030$$

$$B_{x_{spr},y} = B'_{\frac{3}{2}x_{spr}+1,y} * factor_{kep}, \text{ when } edgecode = 0 \times C0C0$$

wherein R(G)$_{x_{spr},y}$ represents the pixel value for the sub-pixel of the R channel or the G channel in the coordinate (x$_{spr}$, y) of the target pixel to be rendered, and B$_{x_{spr},y}$ represents the pixel value for the sub-pixel of the B channel in the coordinate (x$_{spr}$, y) of the target pixel to be rendered, R'(G')$_{x,y}$ represents the pixel value of the R channel or the G channel of the source pixel located at the coordinate (x, y), B'$_{x,y}$ represents the pixel value of the B channel of the source pixel located at the coordinate (x, y), each 3/2x$_{spr}$ in the formula comprises an operation for rounding down to an integer, factor$_{kep}$ is a preset value, and edgecode represents the edge code.

13. The sub-pixel rendering method as claimed in claim 1, wherein when the target image has at least one notch and/or a rounded corner, the pixel value of the source pixel corresponding to the notch and/or the rounded corner in the source image is multiplied by an attenuation coefficient.

14. The sub-pixel rendering method as claimed in claim 13, wherein the attenuation coefficient is related to an area of the source pixel cut by an arch of the notch and/or the rounded corner.

15. The sub-pixel rendering method as claimed in claim 13, wherein the attenuation coefficient is obtained using the following formula:

Area$_{arch}$=(2*offset−1)/(2*step)

wherein Area$_{arch}$ is the attenuation coefficient, offset is a position index of the source pixel in a sawtooth of the notch and/or the rounded corner, and step is the width of the sawtooth of the notch and/or the rounded corner.

16. The sub-pixel rendering method as claimed in claim 13, wherein the coordinate information of the notch and/or of the rounded corner are stored in a register, and the coordinate information is used to determined that the location of the source pixel corresponding to the notch and/or the rounded corner in the source image.

17. The sub-pixel rendering method as claimed in claim 13, wherein when the sub-pixel of the target pixel to be rendered corresponding to the source pixel in the source image does not exist in the target image, the pixel value of the source pixel in the source image is set to 0.

18. A sub-pixel rendering device, comprising:
a storage device, storing a source image and a target image;
a processor, generating the target image according to the source image;
wherein the processor obtains the source image from the storage device, determines a target pixel to be rendered in the target image, and calculates an edge code of the source pixel corresponding to a sub-pixel of the target pixel to be rendered in the source image, determines texture information around the sub-pixel of the target pixel to be rendered according to the edge code, and calculates a pixel value for the sub-pixel of the target pixel to be rendered according to the texture information and based on distance when the edge code is not a specific pattern.

19. The sub-pixel rendering device as claimed in claim 18, wherein the step of calculating a pixel value for the sub-pixel of the target pixel to be rendered according to the texture information and based on distance executed by the processor further comprises:

when the texture information around the sub-pixel of the target pixel to be rendered is weak, a smoothing process is performed when the processor calculates the pixel value for the sub-pixel of the target pixel to be rendered.

20. The sub-pixel rendering device as claimed in claim 18, wherein when a code of the horizontal direction in the edge code is 0x8 or 0x4, the processor determines that the texture information around the sub-pixel of the target pixel to be rendered is weak.

* * * * *